United States Patent
Wang et al.

(10) Patent No.: US 12,432,594 B2
(45) Date of Patent: Sep. 30, 2025

(54) INTER-CELL BEAM MANAGEMENT FOR 5G SYSTEMS

(71) Applicant: Intel Corporation, Santa Clara, CA (US)

(72) Inventors: Guotong Wang, Beijing (CN); Alexei Davydov, Nizhny Novgorod (RU); Bishwarup Mondal, San Ramon, CA (US); Avik Sengupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 17/918,834

(22) PCT Filed: May 12, 2021

(86) PCT No.: PCT/US2021/032030
§ 371 (c)(1),
(2) Date: Oct. 13, 2022

(87) PCT Pub. No.: WO2021/236159
PCT Pub. Date: Nov. 18, 2021

(65) Prior Publication Data
US 2023/0140323 A1  May 4, 2023

(30) Foreign Application Priority Data

May 13, 2020 (WO) ............... PCT/CN2020/090008
May 13, 2020 (WO) ............... PCT/CN2020/090057
(Continued)

(51) Int. Cl.
*H04B 7/022* (2017.01)
*H04B 7/0408* (2017.01)
(Continued)

(52) U.S. Cl.
CPC ............ *H04W 24/10* (2013.01); *H04B 7/022* (2013.01); *H04B 7/0408* (2013.01); *H04B 17/24* (2015.01);
(Continued)

(58) Field of Classification Search
CPC ... H04B 7/02–12; H04B 17/0082–3913; H04J 11/00–0093;
(Continued)

(56) References Cited

U.S. PATENT DOCUMENTS

2019/0222286 A1*  7/2019  Miao ................. H04W 24/10
2020/0045655 A1*  2/2020  Joseph .............. H04W 24/10
(Continued)

FOREIGN PATENT DOCUMENTS

EP  4093130 A1  11/2022

OTHER PUBLICATIONS

International Patent Office—International Search Report and Written Opinion mailed Sep. 1, 2021 from International Application No. PCT/US2021/032030, 12 pages.
(Continued)

*Primary Examiner* — Timothy J Weidner
(74) *Attorney, Agent, or Firm* — Eversheds Sutherland (US) LLP

(57) ABSTRACT

Systems, apparatuses, methods, and computer-readable media are provided for pathloss reference signal configuration when different cell IDs are configured for multi-TRP operation. Other embodiments may be described and/or claimed.

20 Claims, 22 Drawing Sheets retrieving, from memory, configuration information for a pathloss reference signal associated with an uplink signal to be transmitted using inter-cell multi-transmission-reception point (TRP) operation, wherein the configuration information includes a cell identifier (ID) and a frequency domain position of a synchronization signal block (SSB) associated with the pathloss reference signal
2305 measuring a pathloss on the pathloss reference signal based on the configuration information
2310

(30) Foreign Application Priority Data

May 29, 2020 (WO) ................ PCT/CN2020/093290
Jun. 12, 2020 (WO) ................ PCT/CN2020/095863

(51) Int. Cl.
| | |
|---|---|
| *H04B 17/20* | (2015.01) |
| *H04B 17/24* | (2015.01) |
| *H04L 5/00* | (2006.01) |
| *H04W 24/10* | (2009.01) |
| *H04W 56/00* | (2009.01) |
| *H04W 72/23* | (2023.01) |
| *H04W 76/19* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ........... *H04B 17/252* (2023.05); *H04L 5/001* (2013.01); *H04L 5/0035* (2013.01); *H04W 56/001* (2013.01); *H04W 72/23* (2023.01); *H04W 76/19* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ...... H04J 2011/0003–0096; H04L 5/00–0098; H04L 27/26–26136; H04W 8/22–245; H04W 24/02–10; H04W 28/02–26; H04W 36/0005–385; H04W 48/02–20; H04W 56/001–0025; H04W 72/02–569; H04W 76/10–50; H04W 84/02–16; H04W 88/02–12; H04W 92/02–04; H04W 92/10
See application file for complete search history.

(56) References Cited

U.S. PATENT DOCUMENTS

| | | |
|---|---|---|
| 2020/0052802 A1 | 2/2020 | Ryu et al. |
| 2020/0146059 A1 | 5/2020 | Cirik et al. |
| 2022/0386154 A1* | 12/2022 | Maattanen ............ H04W 24/10 |

OTHER PUBLICATIONS

Apple Inc., "Remaining Issues on Multi-TRP Enhancement," 3GPP TSG RAN WG1 #99, R1-1912823, Agenda Item: 7.2.8.2, Nov. 18-22, 2019, Reno, USA, 10 pages.

CMCC, "Remaining issues on multi-beam operation," 3GPP TSG RAN WG1 #100bis, R1-2002213, Agenda item: 7.2.6.3, Apr. 20-30, 2020, e-Meeting, 8 pages.

Huawei et al., "Feature Summary of Enhancements on Multi-TRP/Panel Transmission," 3GPP TSG RAN WG1 Meeting #98bis, R1-1911425, Agenda Item: 7.2.8.2, Oct. 14-20, 2019, Chongqing, 100 pages.

Huawei et al., "Considerations on UL procedures for NR positioning," 3GPP TSG-RAN WG2 Meeting #108, R2-1914979, Agenda item: 6.8.2.1, Nov. 18-22, 2019, Reno, US, 8 pages.

European Patent Office- Partial Supplementary European Search Report mailed Apr. 23, 2024, from EP Application No. 21802974.2, 16 pages.

European Patent Office- Extended European Search Report mailed Sep. 6, 2024, from EP Application No. 21802974.2, 18 pages.

Qualcomm Incorporated, "Multi-TRP Enhancements," 3GPP TSG-RAN WG1 Meeting #98bis, R1-1911126, Agenda item: 7.2.8.2, Oct. 14-20, 2019, Chongqing, China, 26 pages.

Huawei et al., "Physical layer aspects for NR mobility enhancements," 3GPP TSG RAN WG1 Meeting #97, R1-1906056, Agenda Item: 7.2.12.1, May 13-17, 2019, Reno, USA, 12 pages.

Ericsson, "Remaining issues for mTRP," 3GPP TSG RAN WG1 #98bis, R1-1910865, Agenda Item: 7.2.8.2, Oct. 14-20, 2019, Chongqing, China, 15 pages.

\* cited by examiner

```
PUSCH-PathlossReferenceRS-r16 ::=SEQUENCE {
    pusch-PathlossReferenceRS-Id-r16    PUSCH-PathlossReferenceRS-Id-r16,
    referenceSignal-r16                 CHOICE {
        ssb-Index-r16                       SSB-Index,
        csi-RS-Index-r16                    NZP-CSI-RS-ResourceId
}
```

Figure 1

```
PUCCH-PathlossReferenceRS ::=       SEQUENCE {
    pucch-PathlossReferenceRS-Id        PUSCH-PathlossReferenceRS-Id,
    referenceSignal                     CHOICE {
        ssb-Index                           SSB-Index,
        csi-RS-Index                        NZP-CSI-RS-ResourceId
}
```

Figure 2

```
PathlossReferenceRS-Config ::=      CHOICE {
    ssb-Index                           SSB-Index,
    csi-RS-Index                        NZP-CSI-RS-ResourceId
}
```

Figure 3

```
PUSCH-PathlossReferenceRS-r17 ::=   SEQUENCE {
   pusch-PathlossReferenceRS-Id-r17    PUSCH-PathlossReferenceRS-Id-r17,
      referenceSignal-r17            CHOICE {
         ssb-Index-r17               SSB-Index,
         physCellId                  PhysCellId,
         ssbFrequency                 ARFCN-ValueNR,
         ssbSubcarrierSpacing          SubcarrierSpacing,
         csi-RS-Index-r17            NZP-CSI-RS-ResourceId
      }
}
```

Figure 5

```
PUCCH-PathlossReferenceRS-r17 ::=            SEQUENCE {
   pucch-PathlossReferenceRS-Id         PUCCH-PathlossReferenceRS-Id,
   referenceSignal                      CHOICE {
      ssb-Index                         SSB-Index,
      physCellId                        PhysCellId,
      ssbFrequency                         ARFCN-ValueNR,
      ssbSubcarrierSpacing                 SubcarrierSpacing,
      csi-RS-Index                      NZP-CSI-RS-ResourceId
   }
}
```

Figure 6

```
PathlossReferenceRS-Config-r17 ::=        CHOICE {
    ssb-Index                    SSB-Index,
    physCellId                   PhysCellId,
    ssbFrequency                  ARFCN-ValueNR,
    ssbSubcarrierSpacing          SubcarrierSpacing,
    csi-RS-Index                 NZP-CSI-RS-ResourceId
}
```

Figure 7

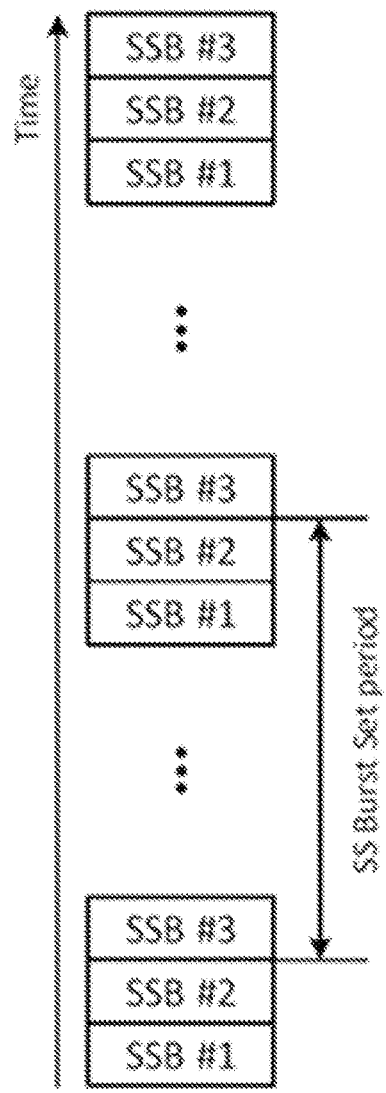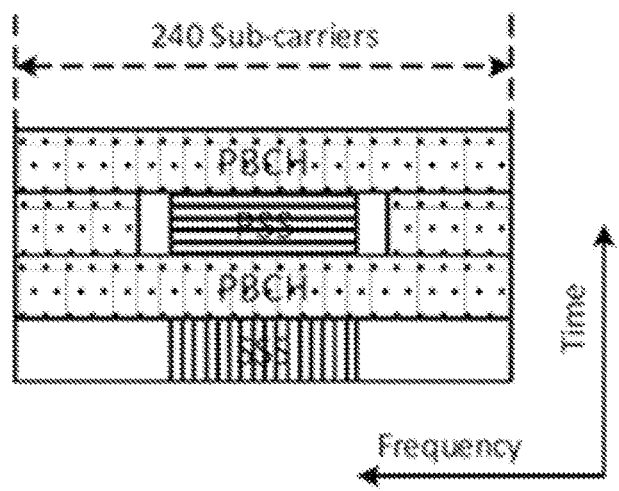
Figure 8

```
TCI-State  ::=       SEQUENCE {
    tci-StateId          TCI-StateId,
    qcl-Type1            QCL-Info,
    qcl-Type2            QCL-Info                    OPTIONAL,    -- Need R
    ...
}

QCL-Info  ::=        SEQUENCE {
    cell                 ServCellIndex                            OPTIONAL,   -- Need R
    bwp-Id               BWP-Id                                   OPTIONAL,   -- Cond CSI-
RS-Indicated
    referenceSignal      CHOICE {
        csi-rs               NZP-CSI-RS-ResourceId,
        ssb                  SSB-Index
    },
    qcl-Type             ENUMERATED {typeA, typeB, typeC, typeD},
    ...
}
```

Figure 12

```
PUCCH-SpatialRelationInfo ::=   SEQUENCE {
    pucch-SpatialRelationInfoId     PUCCH-SpatialRelationInfoId,
    servingCellId                   ServCellIndex                           OPTIONAL,
-- Need S
    referenceSignal                 CHOICE {
        ssb-Index                       SSB-Index,
        csi-RS-Index                    NZP-CSI-RS-ResourceId,
        srs                             PUCCH-SRS
    },
    pucch-PathlossReferenceRS-Id    PUCCH-PathlossReferenceRS-Id,
    p0-PUCCH-Id                     P0-PUCCH-Id
    closedLoopIndex                 ENUMERATED  { i0, i1 }
}
```

Figure 13

```
SRS-SpatialRelationInfo ::=     SEQUENCE {
    servingCellId                   ServCellIndex                           OPTIONAL,
-- Need S
    referenceSignal                 CHOICE {
        ssb-Index                       SSB-Index,
        csi-RS-Index                    NZP-CSI-RS-ResourceId,
        srs                             SEQUENCE {
            resourceId                      SRS-ResourceId,
            uplinkBWP                       BWP-Id
        }
    }
}
```

Figure 14

```
TCI-State   ::=           SEQUENCE {
  tci-StateId               TCI-StateId,
  qcl-Type1                 QCL-Info,
  qcl-Type2                 QCL-Info             OPTIONAL,       -- Need R
  ...
}

QCL-Info    ::=           SEQUENCE {
  cell                      ServCellIndex        OPTIONAL,       -- Need R
  bwp-Id                    BWP-Id               OPTIONAL,       -- Cond CSI-RS-Indicated
  referenceSignal           CHOICE {
    csi-rs                    NZP-CSI-RS-ResourceId,
    ssb                       SSB-Index,
    physCellId                PhysCellId,
    ssbFrequency              ARFCN-ValueNR,
    ssbSubcarrierSpacing      SubcarrierSpacing,
  },
  qcl-Type                  ENUMERATED {typeA, typeB, typeC, typeD},
  ...
}
```

Figure 15

```
TCI-State ::=           SEQUENCE {
    tci-StateId             TCI-StateId,
    qcl-Type1               QCL-Info,
    qcl-Type2               QCL-Info              OPTIONAL,    -- Need R
    ...
}

QCL-Info ::=            SEQUENCE {
    cell                    ServCellIndex
    bwp-Id                  BWP-Id
    referenceSignal         CHOICE {
        csi-rs                  NZP-CSI-RS-ResourceId,
        ssb                     SSB-Index
        physCellId              PhysCellId,
        ssbFrequency            ARFCN-ValueNR,
        ssbSubcarrierSpacing    SubcarrierSpacing,
    },                                            OPTIONAL,
    qcl-Type                ENUMERATED {typeA, typeB, typeC, typeD},    OPTIONAL,  -- Cond CSI-RS-Indicated
    ...
}
```

Figure 16

```
PUCCH-SpatialRelationInfo-r17 ::=            SEQUENCE {
    pucch-SpatialRelationInfoId-r17          PUCCH-SpatialRelationInfoId-r17,
    servingCellId-r17                        ServCellIndex                                     OPTIONAL,    -- Need S
    referenceSignal-r17                      CHOICE {
        ssb-Index                                SSB-Index,
        physCellId                               PhysCellId,
        ssbFrequency                             ARFCN-ValueNR,
        ssbSubcarrierSpacing                     SubcarrierSpacing,
        csi-RS-Index                             NZP-CSI-RS-ResourceId,
        srs                                      PUCCH-SRS
    },
    panelID                                  INTEGER (0   maxNrofUEPanels-1)
    pucch-PathlossReferenceRS-Id-r17         PUCCH-PathlossReferenceRS-Id-r17,
    p0-PUCCH-Id-r17                          P0-PUCCH-Id
    closedLoopIndex-r17                      ENUMERATED {i0, i1}
}
```

Figure 17

```
SRS-SpatialRelationInfo-r17  ::=        SEQUENCE {
    servingCellId           ServCellIndex             OPTIONAL,  -- Need S
    referenceSignal         CHOICE {
        ssb-Index,
        physCellId,
        ssbFrequency        ARFCN-ValueNR,
        ssbSubcarrierSpacing SubcarrierSpacing,
        csi-RS-Index        NZP-CSI-RS-ResourceId,
        srs                 SEQUENCE {
            resourceId      SRS-ResourceId,
            uplinkBWP       BWP-Id
        },
    },
    panelID                 INTEGER (0..maxNrofUEPanels-1)
}
```

Figure 18

```
pucch-ResourceGroupId-r16       PUCCH-ResourceGroupId-r16,
resourcePerGroupList-r16        SEQUENCE (SIZE (1..maxNrofPUCCH-ResourcesPerGroup-r16))
                                OF PUCCH-ResourceId
physCellId                      PhysCellId,
}
```

Figure 19 retrieving, from memory, configuration information for a pathloss reference signal associated with an uplink signal to be transmitted using inter-cell multi-transmission-reception point (TRP) operation, wherein the configuration information includes a cell identifier (ID) and a frequency domain position of a synchronization signal block (SSB) associated with the pathloss reference signal
2305

measuring a pathloss on the pathloss reference signal based on the configuration information
2310

Figure 23 determining configuration information regarding synchronization signal blocks (SSBs) having different cell identifiers (IDs), wherein the configuration information is to configure a user equipment (UE) for multiple transmission and reception point (multi-TRP) operation
2405

↓ encoding a message that includes the configuration information for transmission to the UE
2410

Figure 24 receiving a message that includes configuration information indicating a plurality of synchronization signal blocks (SSBs) with different cell identifiers, wherein the configuration includes a beam failure recovery configuration information element that is to configure the UE with candidate reference signals from different cells for inter-cell beam failure detection
2505

performing a beam failure recovery operation based on the configuration information
2510

Figure 25 performing a beam measurement operation
2605 encoding a beam reporting message for transmission based on the beam measurement, wherein the beam reporting message includes a cell identifier associated with a synchronization signal block resource indicator (SSBRI) or channel state information-reference signal resource indicator (CRI)
2610

INTER-CELL BEAM MANAGEMENT FOR 5G SYSTEMS

CROSS REFERENCE TO RELATED APPLICATIONS

The present application is a national phase entry under 35 U.S.C. § 371 of International Application No. PCT/US2021/032030, filed Feb. 14, 2018, entitled "INTER-CELL BEAM MANAGEMENT FOR 5G SYSTEMS," which claims priority to: PCT Application No. PCT/CN2020/090008, which was filed May 13, 2020; PCT Application No. PCT/CN2020/090057, which was filed May 13, 2020; PCT Application No. PCT/CN2020/093290, which was filed May 29, 2020; and PCT Application No. PCT/CN2020/095863, which was filed Jun. 12, 2020, the disclosures of which are hereby incorporated by reference.

FIELD

Various embodiments generally may relate to the field of wireless communications. For example, some embodiments may relate to fifth generation new radio (5G NR) Rel-15/Rel-16, where for uplink power control, a user equipment (UE) can be configured with a pathloss reference signal (PL RS) to measure the downlink path loss. The PL RS could be configured for physical uplink sharded channel (PUSCH), physical uplink control channel (PUCCH) and sounding reference signal (SRS) respectively.

BACKGROUND

Other embodiments may relate to 5G NR Rel-15/Rel-16, where a synchronization signal/physical broadcast channel (SS/PBCH) Block (SSB) which contains synchronization signals is transmitted periodically and could be used for beam management purposes. With multi-beam operation, each SSB is intended for a specific next-generation NodeB (gNB) transmission (Tx) beam. The periodicity of SSB is denoted as SS Burst Set Period.

Other embodiments may relate to NR Rel-15, where a beam failure recovery operation is supported. The UE could be configured with periodic reference signal from the serving cell, e.g., channel state information-reference signal (CSI-RS) or SSB, for beam failure detection. The UE should measure the quality of the configured RS. If the RS quality is below certain threshold, the UE declares a beam failure instance. If a certain number of consecutive beam failure instance (indicated by a counter N) is detected within a time window (indicated by a timer T), then the beam failure is declared.

Other embodiments may relate to 5G NR Rel-15/Rel-16, where a user equipment (UE) could be configured with a TCI (Transmission Configuration Indicator) state for beam indication in the downlink. The TCI states contains downlink reference signal (CSI-RS, SSB) and QCL type information.

BRIEF DESCRIPTION OF THE FIGURES

FIG. 1 illustrates an example of an information element (IE) of PUSCH-PathlossReferenceRS in Rel-16 to configure PL RS for PUSCH.

FIG. 2 illustrates an example of an IE for PL RS configuration for PUCCH.

FIG. 3 illustrates an example of PL RS configuration for SRS.

FIG. 5 shows an example of a PUSCH pathloss reference signal configuration, in accordance with various embodiments.

FIG. 6 shows an example of a PUCCH pathloss reference signal configuration, in accordance with various embodiments.

FIG. 7 shows an example of a SRS pathloss reference signal configuration, in accordance with various embodiments.

FIG. 8 illustrates an example of a synchronization signal block (SSB) and SSB transmission in accordance with various embodiments.

FIG. 12 illustrates an example of a TCI state configuration information in accordance with various embodiments.

FIG. 13 illustrates an example of PUCCH spatial relation information in accordance with various embodiments.

FIG. 14 illustrates an example of SRS spatial relation information in accordance with various embodiments.

FIG. 15 illustrates an example of TCI state configuration information with cell identification in accordance with various embodiments.

FIG. 16 illustrates an example of TCI state configuration information with cell identification and UE panel identification in accordance with various embodiments.

FIG. 17 illustrates an example of PUCCH spatial relation information with cell identification and UE panel identification in accordance with various embodiments.

FIG. 18 illustrates an example of SRS spatial relation information with cell identification and UE panel identification in accordance with various embodiments.

FIG. 19 illustrates an example of PUCCH resource grouping with cell identification in accordance with various embodiments.

FIG. 23 depicts an example procedure for practicing the various embodiments discussed herein.

FIG. 24 depicts another example procedure for practicing the various embodiments.

FIG. 25 depicts another example procedure for practicing the various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments may be directed to: pathloss reference signal configuration for inter-cell multi-TRP, inter-cell beam management for multi-TRP operation, inter-cell beam failure recovery, or inter-cell beam indication with multi-TRP multi-panel operation. Other embodiments may be described as well.

Pathloss Reference Signal Configuration for Inter-Cell Multi-TRP

In 5G NR Rel-15/Rel-16, for uplink power control, the UE could be configured with a pathloss reference signal (PL RS) to measure the downlink path loss. The pathloss RS could be configured for PUSCH, PUCCH and SRS respectively.

For example, FIG. 1 shows the information element (IE) of PUSCH-PathlossReferenceRS in Rel-16 to configure PL RS for PUSCH. FIG. 2 shows the IE for PL RS configuration for PUCCH. FIG. 3 is the PL RS configuration for SRS.

Figure 4:
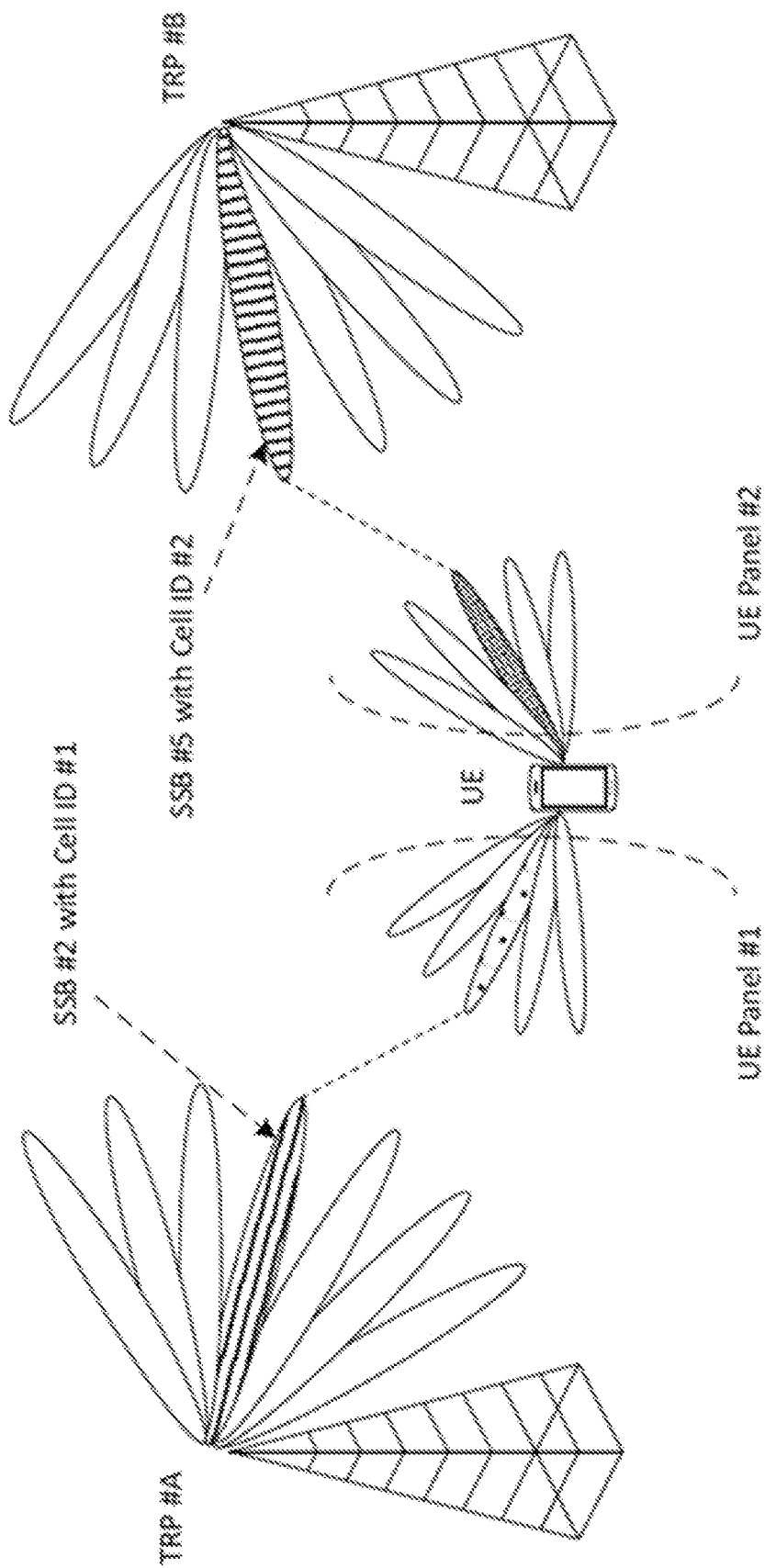
FIG. 4 illustrates an example of inter-cell multi-TRP operation in accordance with various embodiments.

In Rel-17, inter-cell operation could be supported for multi-TRP multi-panel. As shown in FIG. 4, in the multi-TRP operation, the TRPs could be configured with different cell IDs. Therefore, for pathloss RS configuration, the Cell ID information should be added to corresponding SSB index.

However, the current pathloss reference signal configuration doesn't consider inter-cell multi-TRP operation. Among other things, some embodiments of this disclosure are directed to novel methods for pathloss reference signal configuration if different cell IDs are configured in the scenario of multi-TRP operation.

In an embodiment, for the PUSCH power control in the scenario of inter-cell multi-TRP operation, in the information element of PUSCH-PathlossReferenceRS, the cell ID information and the frequency domain position of the SSB should be added. The subcarrier spacing should be provided if it is different from subcarrier spacing of the serving cell. FIG. 5 shows an example of the PUSCH pathloss reference signal configuration.

In an embodiment, for PUCCH power control in the scenario of inter-cell multi-TRP operation, in the information element of PUCCH-PathlossReferenceRS, the cell ID information and the frequency domain position of the SSB should be added. The subcarrier spacing should be provided if it is different from subcarrier spacing of the serving cell. FIG. 6 shows an example of the PUCCH pathloss reference signal configuration.

In an embodiment, for SRS power control in the scenario of inter-cell multi-TRP operation, in the information element of PathlossReferenceRS-config which is contained in the configuration of SRS-ResourceSet, the cell ID information and the frequency domain position of the SSB should be added. The subcarrier spacing should be provided if it is different from subcarrier spacing of the serving cell. FIG. 7 shows an example of the SRS pathloss reference signal configuration.

In another embodiment, for SRS power control in the scenario of inter-cell multi-TRP operation, the SRS pathloss reference signal could be configured at the SRS resource level. The IE of PathlossReferenceRS-config which includes Cell ID information could be contained in the IE of SRS-Resource.

In an embodiment, a default pathloss RS for PUCCH/SRS could be applied in order to reduce the higher layer signaling overhead to activate/deactivate the pathloss RS. For PUCCH/SRS, the default pathloss RS on a target TRP is the QCL-Type D RS of the same TCI state/QCL assumption of the CORESET with the lowest ID among those CORESETs with the same Cell ID.

If the CORESET is not configured on a target TRP and at least one active state is configured for the PDSCH, then the default pathloss RS on the target TRP is the QCL-Type D RS of the active TCI state with the lowest ID among those TCI states with the same Cell ID for the PDSCH.

In an embodiment, in order to enable PUSCH scheduling with DCI format 0_0 in the scenario of inter-cell multi-TRP, a default pathloss RS for PUSCH can be applied. If no PUCCH resources are configured on the target TRP, the default pathloss RS for PUSCH is the QCL-Type D RS of the same TCI state/QCL assumption of the CORESET with the lowest ID among those CORESETs with the same Cell ID. Alternatively the default pathloss RS for PUSCH is the pathloss RS for the PUCCH resource with the lowest ID targeting at the TRP with the same Cell ID.

Inter-Cell Beam Management for Multi-TRP Operation

In 5G NR Rel-15/Rel-16, SS/PBCH Block (SSB) which contains synchronization signals is transmitted periodically and could be used for beam management purpose. With multi-beam operation, each SSB is intended for a specific gNB Tx beam. The periodicity of SSB is denoted as SS Burst Set Period.

The SSB is composed of NR PSS (Primary Synchronization Signal), NR SSS (Secondary Synchronization Signal) and NR PBCH (Physical Broadcast Channel). The SSB is transmitted with a single antenna port. The SSB with the same index recurring with the SSB periodicity is QCLed. FIG. 8 shows the SSB structure and example of transmission.

In NR Rel-15/Rel-16, the maximum number of SSBs is 64 for Frequency Range 2 (FR2), which means the SSB index (0~63) is indicated by 6 bits. For SSB index, 3 bits are carried by PBCH contents, and the other 3 bits are indicated by 8 different PBCH DMRS sequences.

In NR Rel-15/Rel-16, the gNB could transmit multiple SSBs in different frequency locations, e.g., SSBs with different center frequency. However, from the UE perspective, it will treat different SSBs transmitted in different frequency location as SSB corresponding to different cells, e.g., one cell is associated with a single frequency location.

For beam management procedures, the gNB could configure the UE with multiple SSB resources only from the serving cell as indicated by logical SSB indexes via RRC information element CSI-SSB-ResourceSet. After Tx/Rx beam sweeping the UE could report to gNB the Tx beam(s) that can be used for the DL/UL transmission. The Tx beam indication is performed using SSB Resource Indicator (SSBRI). Therefore, with the existing beam management framework based on SSB, only one gNB Tx beam is transmitted to the UE at a time instance and only the SSBs from the same cell/carrier can be configured for beam management.

For multi-TRP operation, in order to support inter-cell beam management, the TRPs may have different Cell IDs.

SSBs with different Cell ID could be sent to the UE. Therefore, the beam management should be enhanced to support SSBs with different Cell IDs.

The current beam management based on SSB only allows TDM multiplexing of SSB. Moreover all SSB transmission should be confined to the same frequency location and physical cell ID of the same cell.

Among other things, embodiments of the present disclosure are directed to SSB-based beam management allowing SSB configuration corresponding to other cell(s) with a physical cell ID and frequency position different from the serving cell.

Inter-Cell Beam Management Based on SSB

In an embodiment, for the scenario of multi-TRP operation in order to support inter-cell beam management, the TRPs could be configured with different Cell IDs. In this case, the SSB with different Cell IDs could be configured to the UE for beam management. FIG. 4 shows an example of such an operation.

The SSBs with different Cell IDs could be FDMed, e.g., occupy different frequency resources over the same OFDM symbols. From the UE perspective, the UE treats the FDMed SSBs with different Cell IDs are from different cells. The SSB with the same index and the same Cell ID recurring with the SSB periodicity is QCLed.

In the RRC information element CSI-SSB-ResourceSet, the gNB could configure the SSBs with different Cell IDs to the UE with one of the following options:

Option A: The SSBs are separated into different subsets and each subset is associated with a Cell ID. The SSB Index within one subset are configured with the same Cell ID. For example, two SSB subset can be configured, one is associated with Cell ID #1 and the other one is associated with Cell ID #2. The SSB index within each subset could range from 1 to 64.

Option B: The SSB index are defined globally among the TRPs cooperating for beam management. For example, for the case of two cooperating TRPs, the SSB index is ranging from 1 to 128.

Figure 9:
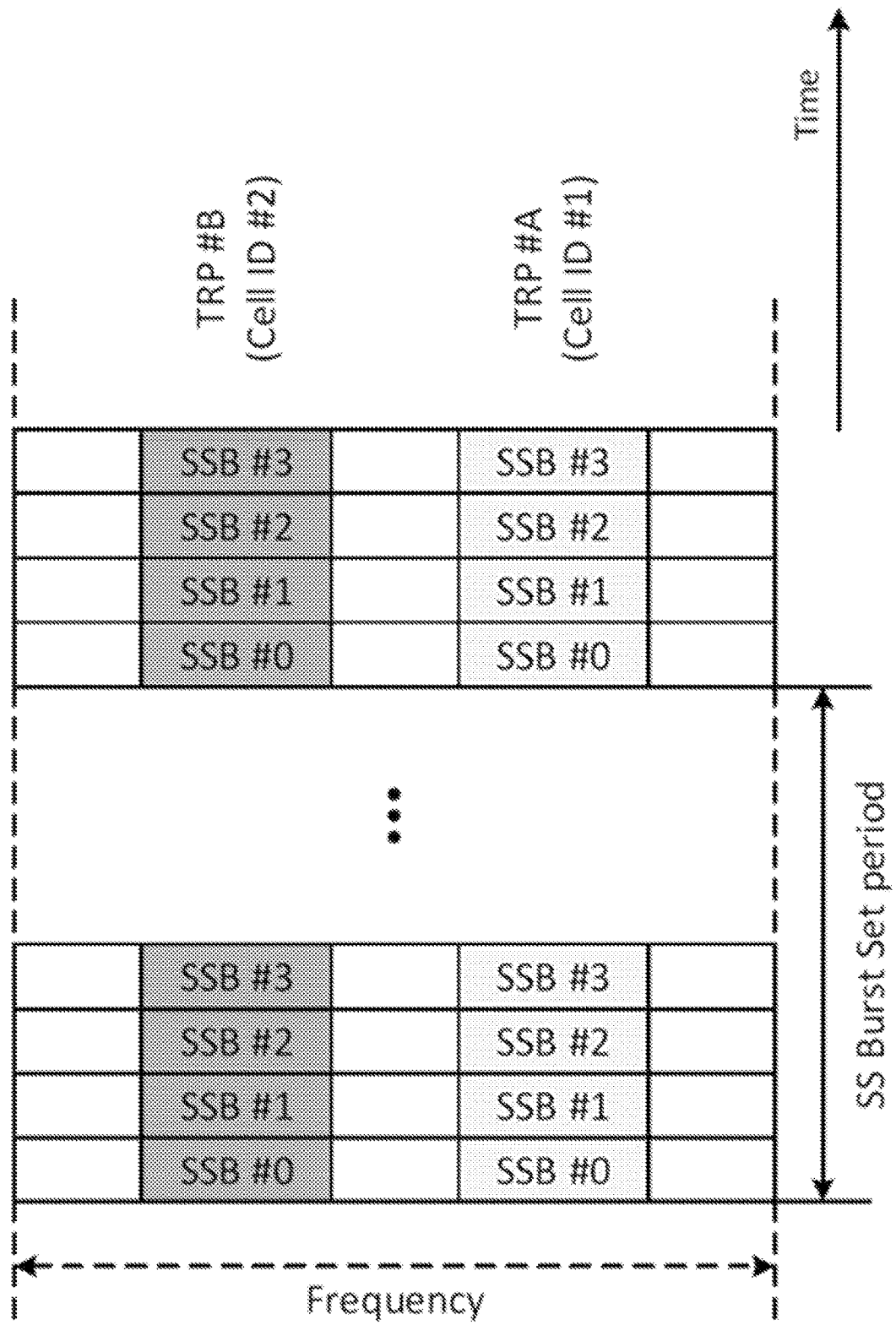
FIG. 9 illustrates an example of SSB configuration for multi-TRP in accordance with various embodiments.

FIG. 9 shows an example of the SSB configuration with different Cell IDs. In another example of this embodiment, the inter-cell beam management is supported by configuring UE with set of SSB resources for L1-RSRP or L1-SINR measurement. In particular CSI-SSB-ResourceSet containing set of logical indices of SSBs configuration may additionally include list of physic cell identities, set of frequency domain position of SSBs and set of subcarrier spacing if it is different from subcarrier spacing of the serving cell.

In another example of this embodiment, the inter-cell beam management is supported by configuring UE with PUCCH-SpatialRelationInfo where a set of logical indices of SSBs may additionally include physical cell identities, set of frequency domain position of SSBs and set of subcarrier spacing if it is different from subcarrier spacing of the serving cell.

PUCCH-SpatialRelationInfo::=SEQUENCE {
pucch-SpatialRelationInfoId PUCCH-SpatialRelationInfoId,
servingCellId ServCellIndex OPTIONAL, --Need S
referenceSignal CHOICE {
ssb-Index SSB-Index,
physCellId PhysCellId,
ssbFrequency ARFCN-ValueNR,
csi-RS-Index NZP-CSI-RS-ResourceId,
srs SEQUENCE {
resource SRS-ResourceId,
uplinkBWP BWP-Id
}
},
pucch-PathlossReferenceRS-Id PUCCH-PathlossReferenceRS-Id,
p0-PUCCH-Id P0-PUCCH-Id,
closedLoopIndex ENUMERATED {i0, i1}
}

In another example of this embodiment, the inter-cell beam management is supported by configuring UE with SRS-SpatialRelationInfo where a set of logical indices of SSBs may additionally include physical cell identities, set of frequency domain position of SSBs and set of subcarrier spacing if it is different from subcarrier spacing of the serving cell.

SRS-SpatialRelationInfo::=SEQUENCE {
servingCellId ServCellIndex OPTIONAL, --Need S
referenceSignal CHOICE {
ssb-Index SSB-Index,
physCellId PhysCellId,
ssbFrequency ARFCN-ValueNR,
csi-RS-Index NZP-CSI-RS-ResourceId,
srs SEQUENCE {
resourceId SRS-ResourceId,
uplinkBWP BWP-Id
}
}
}

Figure 10:
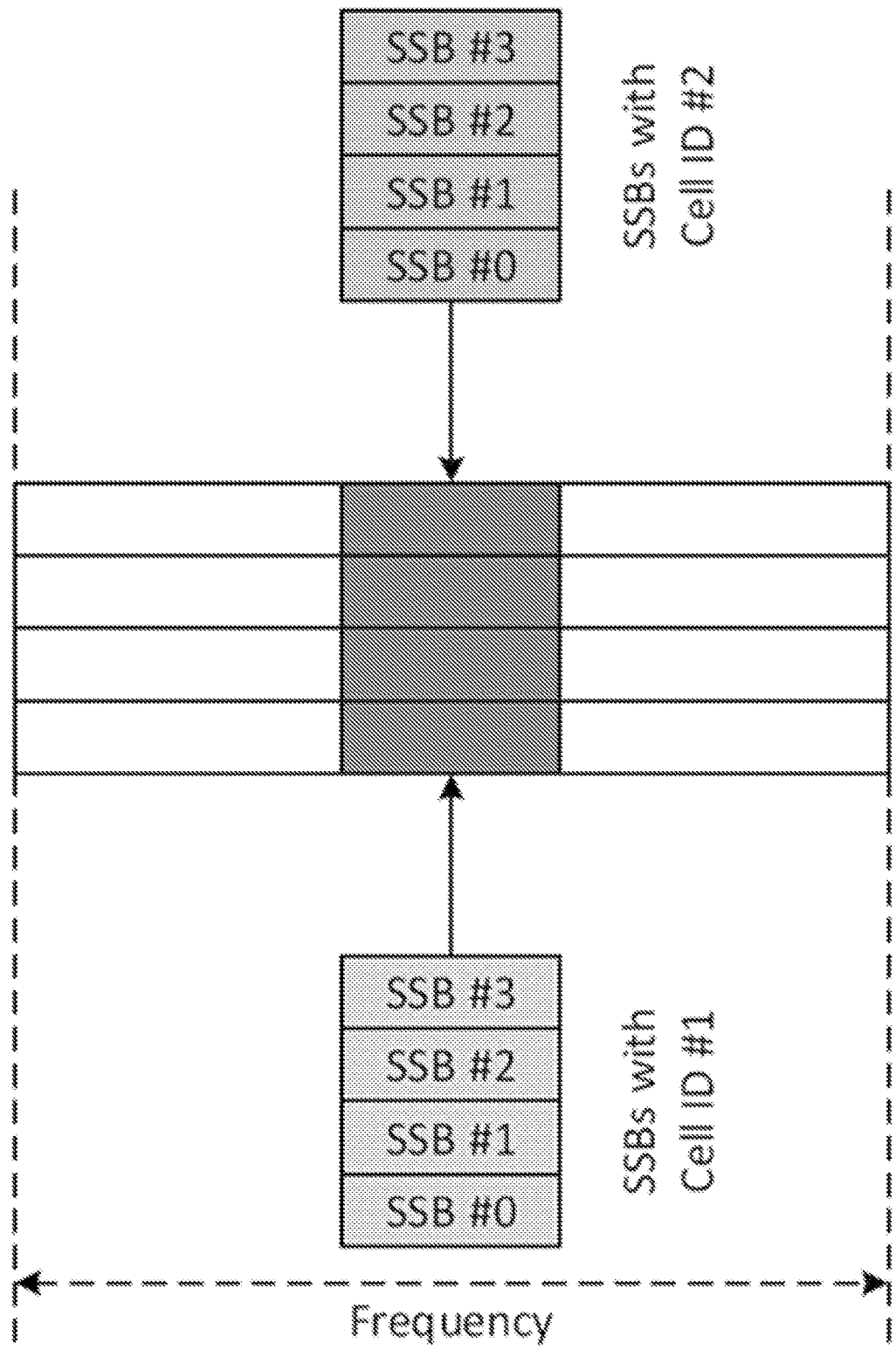
FIG. 10 illustrates an example of SSB multiplexing in accordance with various embodiments.

In another embodiment, the SSBs with different Cell IDs could be mapped over the same frequency position, e.g., the SSBs are SDMed instead of FDMed. FIG. 10 shows an example of the operation.

When configuring SSBs for inter-cell beam management, the information element of CSI-SSB-ResourceSet contain-

```
CSI-SSB-ResourceSet-r17 ::=        SEQUENCE {
    csi-SSB-ResourceSetId          CSI-SSB-ResourceSetId,
    csi-SSB-ResourceList           SEQUENCE (SIZE(1..maxNrofCSI-SSB-ResourcePerSet)
OF SSB-Index,
    physCellId     SEQUENCE (SIZE(1..maxNrofCSI-SSB-ResourcePerSet)) OF
PhysCellId,
    ssbFrequency   SEQUENCE (SIZE(1..maxNrofCSI-SSB-ResourcePerSet)) OF
ARFCN-ValueNR ,
    ssbSubcarrierSpacing SEQUENCE (SIZE(1..maxNrofCSI-SSB-ResourcePerSet)) OF
SubcarrierSpacing,
    ...
}
``` ing set of logical indices of SSBs configuration may additionally include list of physic cell identities, and set of subcarrier spacing if it is different from subcarrier spacing of the serving cell.

```
CSI-SSB-ResourceSet-r17 ::=        SEQUENCE {
   csi-SSB-ResourceSetId           CSI-SSB-ResourceSetId,
   csi-SSB-ResourceList    SEQUENCE (SIZE(1..maxNrofCSI-SSB-ResourcePerSet))
OF SSB-Index,
     physCellId      SEQUENCE (SIZE(1..maxNrofCSI-SSB-ResourcePerSet)) OF
PhysCellId,
     ssbSubcarrierSpacing SEQUENCE (SIZE(1..maxNrofCSI-SSB-ResourcePerSet)) OF
SubcarrierSpacing,
     ...
}
```

Inter-Cell Beam Failure Recovery

In NR Rel-15, beam failure recovery operation is supported. The UE could be configured with periodic reference signal from the serving cell, e.g., CSI-RS or SS/PBCH Block (SSB), for beam failure detection. The UE should measure the quality of the configured RS. If the RS quality is below certain threshold, the UE declares a beam failure instance. If a certain number of consecutive beam failure instance (indicated by a counter N) is detected within a time window (indicated by a timer T), then the beam failure is declared.

The UE should be configured with reference signal, e.g., CSI-RS or SSB, for candidate (new) beam identification. The UE should perform measurement on the configured RS for candidate beam identification. If the quality of the RS is better than certain threshold, then the UE can select it as new beam.

After the beam failure is declared and the new beam is identified, the UE could send beam failure recovery request carried by a dedicated PRACH which is associated with the identified new beam. After receiving the beam failure recovery request, the gNB could transmit with the new beam.

After sending the beam failure recovery request, the UE should monitor a dedicated CORESET. If a DCI is received over the dedicated CORESET, the UE assumes that the beam failure is recovered.

In NR Rel-16, the beam failure recovery operation is extended to the scenario of carrier aggregation (SCell beam failure recovery). When the UE detects beam failure over the Secondary Cell (SCell), the beam failure recovery request could be delivered over the Primary Cell (PCell) by PUCCH.

The SCell beam failure recovery includes two steps. In the first step, the UE delivers the beam failure recovery request over PCell with a dedicated SR-like (Scheduling Request) PUCCH resource. In the second step, the UE sends a MAC-CE to deliver the information on failed CC (Component Carrier) index and new beam index. If new beam is not identified, the new beam index could be omitted.

In NR Rel-17 and future Releases, inter-cell beam management may be introduced for multi-TRP operation. In this scenario, the transmission reception points (TRPs) may be configured with different Cell IDs and the SSBs with different Cell ID could be transmitted to the UE for beam measurements. Therefore, the inter-cell beam failure recovery should be also defined for multi-TRP.

The current beam failure recovery procedure doesn't support inter-cell operation in multi-TRP, in which the TPRs may be configured with different Cell ID.

Among other things, embodiments of this disclosure are directed to inter-cell beam failure recovery in multi-TRP operation scenarios, in which the TRPs may be configured with different Cell IDs. In this invention, SSBs with different Cell ID could be configured to the UE for beam failure detection and candidate beam identification.

In an embodiment, for the scenario of multi-TRP operation, in order to support inter-cell beam management, the TRPs could be configured with different Cell IDs. In this case, the SSBs with different Cell ID could be configured to the UE for beam management. For beam failure recovery operation, the SSBs with different Cell ID could also be configured to the UE, e.g., inter-cell/TRP-specific beam failure recovery could be performed. FIG. 4 shows an example of the operation.

The SSBs with different Cell IDs could be FDMed, e.g., occupy different frequency resources over the same OFDM symbols. From the UE perspective, the UE treats the FDMed SSBs with different Cell IDs are from different cells. The SSB with the same index and the same Cell ID recurring with the SSB periodicity is QCLed. FIG. 9 shows an example of the SSB configuration with different Cell IDs in the scenario of multi-TRP operation. Alternatively, the SSBs with different Cell IDs could be mapped over the same frequency position, e.g., the SSBs are SDMed instead of FDMed.

Figure 11:
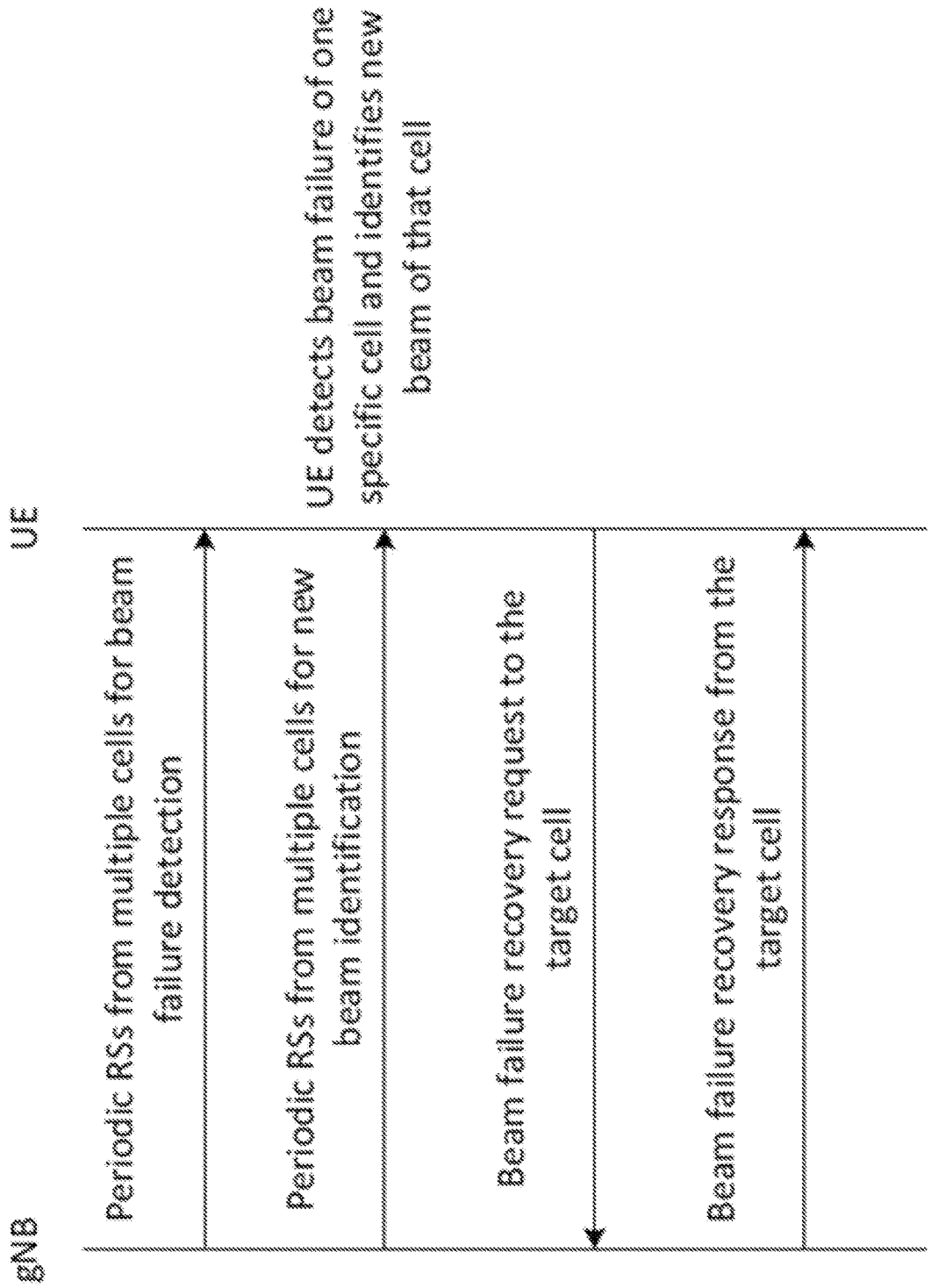
FIG. 11 illustrates an example of an inter-cell beam failure recovery operation in accordance with various embodiments.

For inter-cell beam failure recovery, the UE should be configured with periodic reference signal from multiple cell, e.g., SSBs with different cell ID, to perform beam failure detection. The UE should be also configured with RS from multiple cells for new beam identification. If beam failure is detected with one specific cell, the UE should identify a new candidate beam of the target cell using the configured RS for new beam identification. Then the UE should send beam failure recovery request to the target cell and monitor the beam failure recovery response from the target cell. FIG. 11 shows an example of the inter-cell beam failure recovery operation processing flow.

In another embodiment, the inter-cell beam failure recovery operation could be optional. It can be configured by the network or up to UE capability.

Inter-Cell Beam Failure Detection

In an embodiment, for inter-cell beam failure recovery operation, periodic reference signals with different cell-ID, e.g., SSB index with different Cell ID, could be configured to the UE to perform beam failure detection. In the RRC information element, the physical cell ID should be associated to the SSB index. The SSB frequency position and subcarrier spacing could be also added. Below shows an example of the modification to RRC signaling with italic and bold font.

```
RadioLinkMonitoringRS ::=          SEQUENCE {
   radioLinkMonitoringRS-Id        RadioLinkMonitoringRS-Id,
   purpose              ENUMERATED {beamFailure, rlf, both},
   detectionResource            CHOICE {
      ssb-Index             SSB-Index,
      physCellId               PhysCellId,
      ssbFrequency             ARFCN-ValueNR ,
      ssbSubcarrierSpacing        SubcarrierSpacing,
      csi-RS-Index         NZP-CSI-RS-ResourceId
```

-continued

```
},
 ...
}
```

For inter-cell beam failure detection, separate timer and counter should be maintained by the UE for cells with different Cell ID.

Candidate (New) Beam Identification

In an embodiment, for inter-cell beam failure detection, the UE could be configured with candidate reference signals from different cells, e.g., SSB index with different Cell ID. After beam failure is declared over a specific cell, the UE should identify a candidate new beam over that cell. An example of the modification to BeamFailureRecoveryConfig is shown as below.

```
BeamFailureRecoveryConfig ::=      SEQUENCE {
    rootSequenceIndex-BFR        INTEGER (0..137)
OPTIONAL, -- Need M
    rach-ConfigBFR               RACH-ConfigGeneric
OPTIONAL, -- Need M
    rsrp-ThresholdSSB            RSRP-Range
OPTIONAL, -- Need M
    candidateBeamRSList              SEQUENCE (SIZE(1..maxNrofCandidateBeams)) OF
PRACH-ResourceDedicatedBFR       OPTIONAL, -- Need M
    ssb-perRACH-Occasion             ENUMERATED {oneEighth, oneFourth, oneHalf, one,
two,
                                     four, eight, sixteen}         OPTIONAL, --
Need M
    ra-ssb-OccasionMaskIndex         INTEGER (0..15)
OPTIONAL, -- Need M
    recoverySearchSpaceId            SearchSpaceId
OPTIONAL, -- Need R
    ra-Prioritization                RA-Prioritization
OPTIONAL, -- Need R
    beamFailureRecoveryTimer         ENUMERATED {ms10, ms20, ms40, ms60, ms80,
ms 100, ms 150, ms200}           OPTIONAL, -- Need M
    ...,
    [[
    msg1-SubcarrierSpacing           SubcarrierSpacing
OPTIONAL -- Need M
    ]],
    [[
    ra-PrioritizationTwoStep-r16     RA-Prioritization
OPTIONAL, -- Need R
    candidateBeamRSListExt-r16         SEQUENCE (SIZE(0..maxNrofCandidateBeamsExt-
r16)) OF PRACH-ResourceDedicatedBFR OPTIONAL -- Need
    ]]
}
PRACH-ResourceDedicatedBFR ::=       CHOICE {
    ssb                  BFR-SSB-Resource,
    csi-RS               BFR-CSIRS-Resource
}
BFR-SSB-Resource ::=          SEQUENCE {
    ssb              SSB-Index,
    physCellId           PhysCellId,
    ssbFrequency         ARFCN-ValueNR ,
    ssbSubcarrierSpacing     SubcarrierSpacing,
    ra-PreambleIndex         INTEGER (0..63),
    ...
}
BFR-CSIRS-Resource ::=        SEQUENCE {
    csi-RS           NZP-CSI-RS-ResourceId,
    ra-OccasionList              SEQUENCE (SIZE(1..maxRA-OccasionsPerCSIRS)) OF
INTEGER (0..maxRA-Occasions-1)   OPTIONAL, -- Need R
    ra-PreambleIndex             INTEGER (0..63)
OPTIONAL, -- Need R
    ...
}
```

Beam Failure Recovery Request Transmission

In an embodiment, for inter-cell beam failure recovery operation, the beam failure recovery request could be sent over dedicated PRACH to the target cell. Dedicated PRACH resource should be configured for cells with different Cell ID.

In another embodiment, for inter-cell beam failure recovery operation, the beam failure recovery request could be sent over PUCCH. For example, the UE detects beam failure happens with TRP A (Cell ID #1), and TRP B (Cell ID #2) still works. Then firstly the UE can deliver beam failure recovery request over dedicated SR-like PUCCH resource (PUCCH-BFR) to TRP A. Secondly the UE can deliver a MAC-CE to TRP A reporting the new beam index together with the Cell ID (#2). If the UE has resource for transmission, the first step could be skipped.

Beam Failure Recovery Response

In an embodiment, for inter-cell beam failure recovery, if the beam failure recovery request is sent over PRACH, the UE should monitor a dedicated CORESET from the target cell for beam failure recovery response. After the UE receives DCI over the dedicated CORESET from the target cell, the UE assume the beam failure is recovered with the target cell.

In another embodiment, for inter-cell beam failure recovery, if the beam failure recovery request is sent over PUCCH, after receiving a uplink grant scheduling a new transmission for the same HARQ process ID as the PUSCH carrying the MAC-CE, the UE assumes the beam failure recovery procedure is finished.

Inter-Cell Beam Indication with Multi-TRP Multi-Panel Operation

In 5G NR Rel-15/Rel-16, a user equipment (UE) could be configured with a TCI (Transmission Configuration Indicator) state for beam indication in the downlink. The TCI states contains downlink reference signal (CSI-RS, SSB) and QCL type information, as shown in FIG. 12.

Further, in uplink, the spatial relation is defined for uplink beam indication. FIG. 13 and FIG. 14 shows spatial relation configuration for PUCCH and SRS respectively. For PUSCH, the beam indication is based on SRI (SRS Resource Indicator).

In Rel-17, inter-cell operation could be supported for multi-TRP multi-panel. As shown in FIG. 4, in the multi-TRP operation, the TRPs could be configured with different cell IDs. Therefore, for beam indication in both downlink and uplink, the Cell ID information should be added to the TCI state or the spatial relation information so that the UE could know which beam to use.

In addition, in Rel-16, the PUCCH resources could be split into different groups. However, the grouping rule is up to the network side and it is not known to the UE. Therefore, with multi-TRP operation, when determining the default spatial relation for PUSCH, the UE doesn't know the spatial relation of which PUCCH resource should be followed.

The current beam indication in both downlink and uplink doesn't consider the multi-TRP operation with different Cell IDs. Moreover, the PUCCH resource grouping and association with TRPs is not clear to the UE. Among other things, embodiments of the present disclosure are directed to beam indication in downlink and uplink considering different Cell IDs being configured for different TRPs.

Beam Reporting

After performing beam measurement, the UE should report the DL Tx beam identified by CRI (CSI-RS Resource Indicator) or SSBRI (SSB Resource Indicator), and corresponding L1-RSRP or SINR.

In an embodiment, for beam reporting, the UE may report the Cell ID information for each SSBRI or CRI. The Cell ID could be physical cell ID or logical TRP ID. (for example, if the multi-TRP operation involves 4 TRPs, then the logical TRP ID ranges from 0 to 3). In addition, by reporting Cell ID/TRP ID information, the UE could implicitly maintain an association between the Cell ID/TRP ID with the UE panel ID. With beam indication, the UE could implicitly know which panel should be used according the Cell ID/TRP ID information in the beam indication.

In another embodiment, in the beam reporting, besides the Cell ID information, the UE may also report the UE panel ID information for each SSBRI or CRI, indicating which UE antenna panel is used to receive the corresponding Tx beam. With the Cell ID and UE panel ID, an association between the TRP and UE antenna panel is created and reported to the network side. Alternatively, the UE panel ID could be replaced by the SRS port group ID, e.g., one UE antenna panel is associated with one SRS port group, and this could be applied to all the embodiments of this invention.

Downlink Beam Indication

In an embodiment, the UE could be configured with TCI states according to the beam reporting. In order to support inter-cell beam management, in the TCI state, the cell ID information may be added to the reference signal so that the UE knows which cell the RS is from. The frequency domain position of the SSB may be also included. In addition, the subcarrier spacing may be provided if it is different from subcarrier spacing of the serving cell.

An example is shown in FIG. 15 for a TCI-State configuration with cell ID information (physCellId). The frequency domain position of the SSB (ssbFrequency) is also included. In addition, the subcarrier spacing (ssbSubcarrierSpacing) is included if it is different from subcarrier spacing of the serving cell.

In another embodiment, in order to support inter-cell beam management with multi-panel/multi-TRP operation, in the TCI state, the UE panel information may be additionally included. When the UE receives the TCI state with UE panel information, the corresponding UE panel may be used for the reception from the target cell. An example is shown in FIG. 16, where the UE panel ID information (panelID) is added into the TCI-State IE. Alternatively, the UE panel ID could be added into the QCL-Info IE. The parameter of maxNrofUEPanels indicates the maximum number of UE antenna panels or the maximum number of simultaneously active UE antenna panels, which could be up to UE capability reporting.

Uplink Beam Indication

In an embodiment, for the PUCCH beam indication, in PUCCH-SpatialRelationInfo, the cell ID information and the frequency domain position of the SSB may be added. The subcarrier spacing may be provided if it is different from subcarrier spacing of the serving cell. In addition, the UE panel information may be additionally included to indicate which UE panel should be used. FIG. 17 shows an example of the PUCCH spatial relation configuration.

In an embodiment, in SRS-SpatialRelationInfo, the cell ID information and the frequency domain position of the SSB may be added. The subcarrier spacing may be provided if it is different from subcarrier spacing of the serving cell. In addition, the UE panel information may be additionally included to indicate which UE panel should be used. FIG. 18 shows an example of the SRS spatial relation configuration.

Uplink Default Spatial Relation

In an embodiment, for PUSCH transmission, the spatial relation is indicated by SRI if it is scheduled by DCI format 0_1. If PUSCH is scheduled by DCI format 0_0, a default spatial relation may be followed for the PUSCH transmission. The default spatial relation could be the spatial relation of one specific PUCCH resource.

The PUCCH resource grouping may be associated with TRP or UE panel. In the PUCCH-ResourceGroup, the Cell ID or UE panel ID may be included. Alternatively, the PUCCH grouping could be associated with the logical TRP ID (for example, if the multi-TRP operation involves 4 TRPs, then the logical TRP ID ranges from 0 to 3). FIG. 19 Shows an example of the PUCCH grouping with Cell ID.

In an example to determine the default spatial relation for PUSCH, it follows the spatial relation of the PUCCH resource with the lowest ID within one group associated with the same Cell ID.

Alternatively, the PUCCH group is not associated with Cell ID. The UE determines which PUCCH resource is associated with the same Cell ID through the Cell ID information in PUCCH spatial relation configured for the PUCCH resource.

If there is no PUCCH resource configured which is associated with the same UE panel or the same TRP, then the default spatial relation for PUSCH is the TCI state/QCL assumption of the CORESET with the lowest ID of the same TRP.

In another embodiment, in the scenario of multi-TRP multi-panel, PUSCH is not expected to be scheduled by DCI format 0_0 for the following cases:

Case 1: Single DCI scheduling
Case 2: Inter-cell operation is enabled

Systems and Implementations

Figure 20:
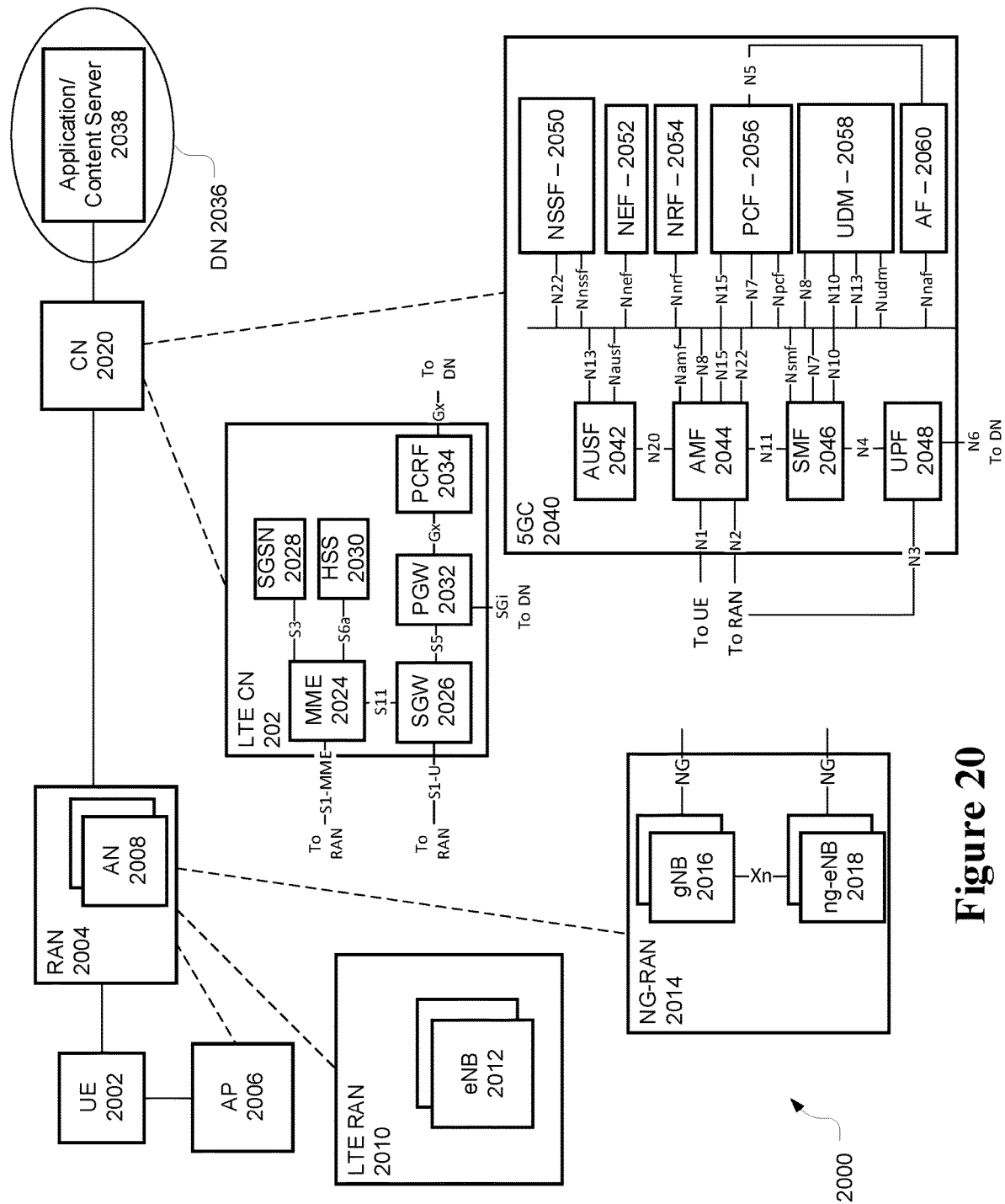
FIG. 20 illustrates a network in accordance with various embodiments.
Figure 21:
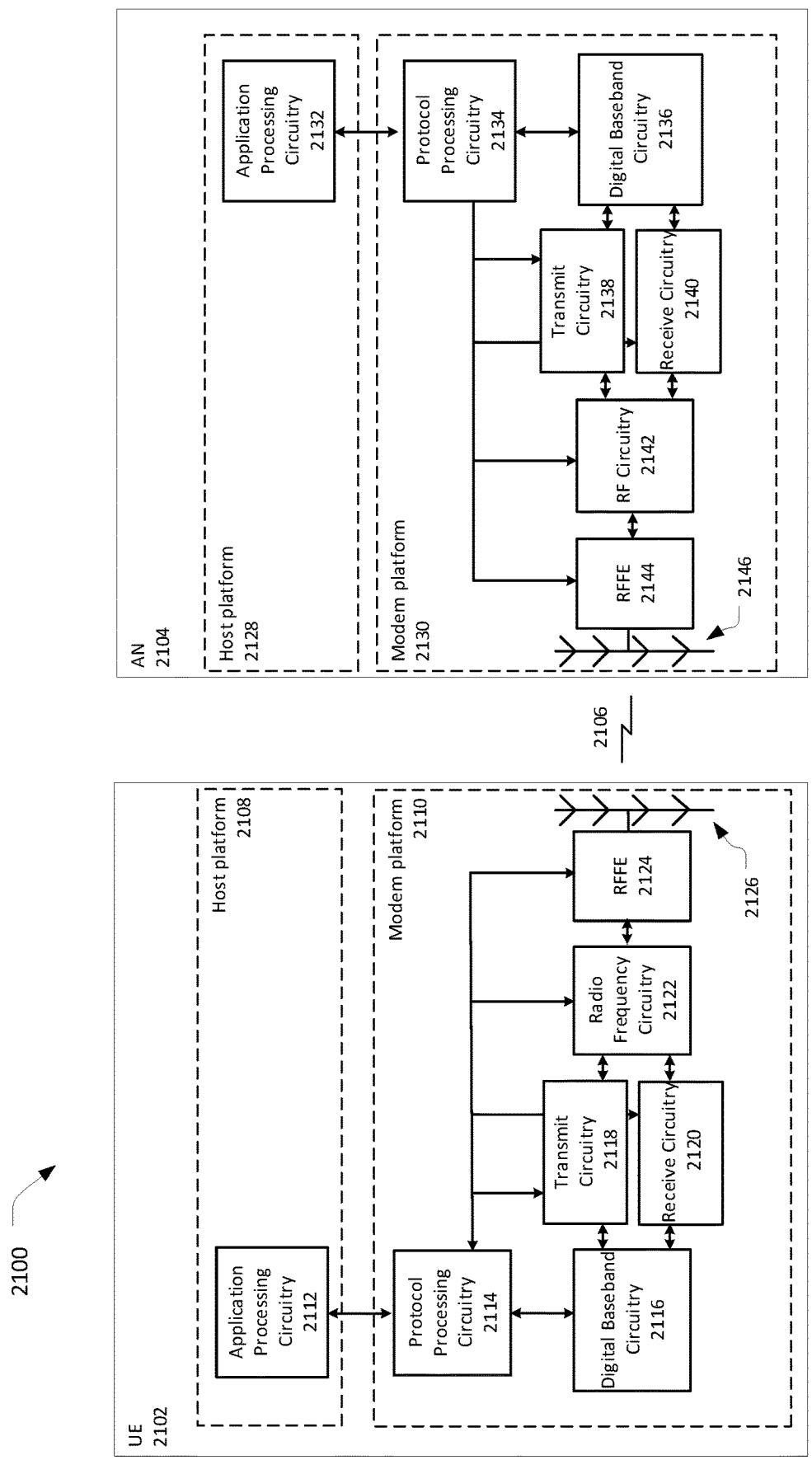
FIG. 21 schematically illustrates a wireless network in accordance with various embodiments.

FIGS. 20-21 illustrate various systems, devices, and components that may implement aspects of disclosed embodiments.

FIG. 20 illustrates a network 2000 in accordance with various embodiments. The network 2000 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 2000 may include a UE 2002, which may include any mobile or non-mobile computing device designed to communicate with a RAN 2004 via an over-the-air connection. The UE 2002 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 2000 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 2002 may additionally communicate with an AP 2006 via an over-the-air connection. The AP 2006 may manage a WLAN connection, which may serve to offload some/all network traffic from the RAN 2004. The connection between the UE 2002 and the AP 2006 may be consistent with any IEEE 802.11 protocol, wherein the AP 2006 could be a wireless fidelity (Wi-Fi®) router. In some embodiments, the UE 2002, RAN 2004, and AP 2006 may utilize cellular-WLAN aggregation (for example, LWA/LWIP). Cellular-WLAN aggregation may involve the UE 2002 being configured by the RAN 2004 to utilize both cellular radio resources and WLAN resources.

The RAN 2004 may include one or more access nodes, for example, AN 2008. AN 2008 may terminate air-interface protocols for the UE 2002 by providing access stratum protocols including RRC, PDCP, RLC, MAC, and L1 protocols. In this manner, the AN 2008 may enable data/voice connectivity between CN 2020 and the UE 2002. In some embodiments, the AN 2008 may be implemented in a discrete device or as one or more software entities running on server computers as part of, for example, a virtual network, which may be referred to as a CRAN or virtual baseband unit pool. The AN 2008 be referred to as a BS, gNB, RAN node, eNB, ng-eNB, NodeB, RSU, TRxP, TRP, etc. The AN 2008 may be a macrocell base station or a low power base station for providing femtocells, picocells or other like cells having smaller coverage areas, smaller user capacity, or higher bandwidth compared to macrocells.

In embodiments in which the RAN 2004 includes a plurality of ANs, they may be coupled with one another via an X2 interface (if the RAN 2004 is an LTE RAN) or an Xn interface (if the RAN 2004 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 2004 may each manage one or more cells, cell groups, component carriers, etc. to provide the UE 2002 with an air interface for network access. The UE 2002 may be simultaneously connected with a plurality of cells provided by the same or different ANs of the RAN 2004. For example, the UE 2002 and RAN 2004 may use carrier aggregation to allow the UE 2002 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 2004 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 2002 or AN 2008 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 2004 may be an LTE RAN 2010 with eNBs, for example, eNB 2012. The LTE RAN 2010 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 2004 may be an NG-RAN 2014 with gNBs, for example, gNB 2016, or ng-eNBs, for example, ng-eNB 2018. The gNB 2016 may connect with 5G-enabled UEs using a 5G NR interface. The gNB 2016 may connect with a 5G core through an NG interface, which may include an N2 interface or an N3 interface. The ng-eNB 2018 may also connect with the 5G core through an NG interface, but may connect with a UE via an LTE air interface. The gNB 2016 and the ng-eNB 2018 may connect with each other over an Xn interface.

In some embodiments, the NG interface may be split into two parts, an NG user plane (NG-U) interface, which carries traffic data between the nodes of the NG-RAN 2014 and a UPF 2048 (e.g., N3 interface), and an NG control plane (NG-C) interface, which is a signaling interface between the nodes of the NG-RAN2014 and an AMF 2044 (e.g., N2 interface).

The NG-RAN 2014 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 2002 can be configured with multiple BWPs where each BWP configuration has a different SCS. When a BWP change is indicated to the UE 2002, the SCS of the transmission is changed as well. Another use case example of BWP is related to power saving. In particular, multiple BWPs can be configured for the UE 2002 with different amount of frequency resources (for example, PRBs) to support data transmission under different traffic loading scenarios. A BWP containing a smaller number of PRBs can be used for data transmission with small traffic load while allowing power saving at the UE 2002 and in some cases at the gNB 2016. A BWP containing a larger number of PRBs can be used for scenarios with higher traffic load.

The RAN 2004 is communicatively coupled to CN 2020 that includes network elements to provide various functions to support data and telecommunications services to customers/subscribers (for example, users of UE 2002). The components of the CN 2020 may be implemented in one physical node or separate physical nodes. In some embodiments, NFV may be utilized to virtualize any or all of the functions provided by the network elements of the CN 2020 onto physical compute/storage resources in servers, switches, etc. A logical instantiation of the CN 2020 may be referred to as a network slice, and a logical instantiation of a portion of the CN 2020 may be referred to as a network sub-slice.

In some embodiments, the CN 2020 may be an LTE CN 2022, which may also be referred to as an EPC. The LTE CN 2022 may include MME 2024, SGW 2026, SGSN 2028, HSS 2030, PGW 2032, and PCRF 2034 coupled with one another over interfaces (or "reference points") as shown. Functions of the elements of the LTE CN 2022 may be briefly introduced as follows.

The MME 2024 may implement mobility management functions to track a current location of the UE 2002 to facilitate paging, bearer activation/deactivation, handovers, gateway selection, authentication, etc.

The SGW 2026 may terminate an SI interface toward the RAN and route data packets between the RAN and the LTE CN 2022. The SGW 2026 may be a local mobility anchor point for inter-RAN node handovers and also may provide an anchor for inter-3GPP mobility. Other responsibilities may include lawful intercept, charging, and some policy enforcement.

The SGSN 2028 may track a location of the UE 2002 and perform security functions and access control. In addition, the SGSN 2028 may perform inter-EPC node signaling for mobility between different RAT networks; PDN and S-GW selection as specified by MME 2024; MME selection for handovers; etc. The S3 reference point between the MME 2024 and the SGSN 2028 may enable user and bearer information exchange for inter-3GPP access network mobility in idle/active states.

The HSS 2030 may include a database for network users, including subscription-related information to support the network entities' handling of communication sessions. The HSS 2030 can provide support for routing/roaming, authentication, authorization, naming/addressing resolution, location dependencies, etc. An S6a reference point between the HSS 2030 and the MME 2024 may enable transfer of subscription and authentication data for authenticating/authorizing user access to the LTE CN 2020.

The PGW 2032 may terminate an SGi interface toward a data network (DN) 2036 that may include an application/content server 2038. The PGW 2032 may route data packets between the LTE CN 2022 and the data network 2036. The PGW 2032 may be coupled with the SGW 2026 by an S5 reference point to facilitate user plane tunneling and tunnel management. The PGW 2032 may further include a node for policy enforcement and charging data collection (for example, PCEF). Additionally, the SGi reference point between the PGW 2032 and the data network 20 36 may be an operator external public, a private PDN, or an intra-operator packet data network, for example, for provision of IMS services. The PGW 2032 may be coupled with a PCRF 2034 via a Gx reference point.

The PCRF 2034 is the policy and charging control element of the LTE CN 2022. The PCRF 2034 may be communicatively coupled to the app/content server 2038 to determine appropriate QoS and charging parameters for service flows. The PCRF 2032 may provision associated rules into a PCEF (via Gx reference point) with appropriate TFT and QCI.

In some embodiments, the CN 2020 may be a 5GC 2040. The 5GC 2040 may include an AUSF 2042, AMF 2044, SMF 2046, UPF 2048, NSSF 2050, NEF 2052, NRF 2054, PCF 2056, UDM 2058, and AF 2060 coupled with one another over interfaces (or "reference points") as shown. Functions of the elements of the 5GC 2040 may be briefly introduced as follows.

The AUSF 2042 may store data for authentication of UE 2002 and handle authentication-related functionality. The AUSF 2042 may facilitate a common authentication framework for various access types. In addition to communicating with other elements of the 5GC 2040 over reference points as shown, the AUSF 2042 may exhibit an Nausf service-based interface.

The AMF 2044 may allow other functions of the 5GC 2040 to communicate with the UE 2002 and the RAN 2004 and to subscribe to notifications about mobility events with respect to the UE 2002. The AMF 2044 may be responsible for registration management (for example, for registering UE 2002), connection management, reachability management, mobility management, lawful interception of AMF-related events, and access authentication and authorization. The AMF 2044 may provide transport for SM messages between the UE 2002 and the SMF 2046, and act as a transparent proxy for routing SM messages. AMF 2044 may also provide transport for SMS messages between UE 2002 and an SMSF. AMF 2044 may interact with the AUSF 2042 and the UE 2002 to perform various security anchor and context management functions. Furthermore, AMF 2044 may be a termination point of a RAN CP interface, which may include or be an N2 reference point between the RAN 2004 and the AMF 2044; and the AMF 2044 may be a termination point of NAS (N1) signaling, and perform NAS ciphering and integrity protection. AMF 2044 may also support NAS signaling with the UE 2002 over an N3 IWF interface.

The SMF 2046 may be responsible for SM (for example, session establishment, tunnel management between UPF 2048 and AN 2008); UE IP address allocation and management (including optional authorization); selection and control of UP function; configuring traffic steering at UPF 2048 to route traffic to proper destination; termination of interfaces toward policy control functions; controlling part of policy enforcement, charging, and QoS; lawful intercept (for SM events and interface to L1 system); termination of SM parts of NAS messages; downlink data notification; initiating AN specific SM information, sent via AMF 2044 over N2 to AN 2008; and determining SSC mode of a session. SM may refer to management of a PDU session, and a PDU session or "session" may refer to a PDU connectivity service that provides or enables the exchange of PDUs between the UE 2002 and the data network 2036.

The UPF 2048 may act as an anchor point for intra-RAT and inter-RAT mobility, an external PDU session point of interconnect to data network 2036, and a branching point to support multi-homed PDU session. The UPF 2048 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 2048 may include an uplink classifier to support routing traffic flows to a data network.

The NSSF 2050 may select a set of network slice instances serving the UE 2002. The NSSF 2050 may also determine allowed NSSAI and the mapping to the subscribed S-NSSAIs, if needed. The NSSF 2050 may also determine the AMF set to be used to serve the UE 2002, or a list of candidate AMFs based on a suitable configuration and possibly by querying the NRF 2054. The selection of a set of network slice instances for the UE 2002 may be triggered by the AMF 2044 with which the UE 2002 is registered by interacting with the NSSF 2050, which may lead to a change of AMF. The NSSF 2050 may interact with the AMF 2044 via an N22 reference point; and may communicate with another NSSF in a visited network via an N31 reference point (not shown). Additionally, the NSSF 2050 may exhibit an Nnssf service-based interface.

The NEF 2052 may securely expose services and capabilities provided by 3GPP network functions for third party, internal exposure/re-exposure, AFs (e.g., AF 2060), edge computing or fog computing systems, etc. In such embodiments, the NEF 2052 may authenticate, authorize, or throttle the AFs. NEF 2052 may also translate information exchanged with the AF 2060 and information exchanged with internal network functions. For example, the NEF 2052 may translate between an AF-Service-Identifier and an internal 5GC information. NEF 2052 may also receive information from other NFs based on exposed capabilities of other NFs. This information may be stored at the NEF 2052 as structured data, or at a data storage NF using standardized interfaces. The stored information can then be re-exposed by the NEF 2052 to other NFs and AFs, or used for other purposes such as analytics. Additionally, the NEF 2052 may exhibit an Nnef service-based interface.

The NRF 2054 may support service discovery functions, receive NF discovery requests from NF instances, and provide the information of the discovered NF instances to the NF instances. NRF 2054 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 2054 may exhibit the Nnrf service-based interface.

The PCF 2056 may provide policy rules to control plane functions to enforce them, and may also support unified policy framework to govern network behavior. The PCF 2056 may also implement a front end to access subscription information relevant for policy decisions in a UDR of the UDM 2058. In addition to communicating with functions over reference points as shown, the PCF 2056 exhibit an Npcf service-based interface.

The UDM 2058 may handle subscription-related information to support the network entities' handling of communication sessions, and may store subscription data of UE 2002. For example, subscription data may be communicated via an N8 reference point between the UDM 2058 and the AMF 2044. The UDM 2058 may include two parts, an application front end and a UDR. The UDR may store subscription data and policy data for the UDM 2058 and the PCF 2056, and/or structured data for exposure and application data (including PFDs for application detection, application request information for multiple UEs 2002) for the NEF 2052. The Nudr service-based interface may be exhibited by the UDR 221 to allow the UDM 2058, PCF 2056, and NEF 2052 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 2058 may exhibit the Nudm service-based interface.

The AF 2060 may provide application influence on traffic routing, provide access to NEF, and interact with the policy framework for policy control.

In some embodiments, the 5GC 2040 may enable edge computing by selecting operator/$3^{rd}$ party services to be geographically close to a point that the UE 2002 is attached to the network. This may reduce latency and load on the network. To provide edge-computing implementations, the 5GC 2040 may select a UPF 2048 close to the UE 2002 and execute traffic steering from the UPF 2048 to data network 2036 via the N6 interface. This may be based on the UE subscription data, UE location, and information provided by the AF 2060. In this way, the AF 2060 may influence UPF (re) selection and traffic routing. Based on operator deployment, when AF 2060 is considered to be a trusted entity, the network operator may permit AF 2060 to interact directly with relevant NFs. Additionally, the AF 2060 may exhibit an Naf service-based interface.

The data network 2036 may represent various network operator services, Internet access, or third party services that may be provided by one or more servers including, for example, application/content server 2038.

FIG. 21 schematically illustrates a wireless network 2100 in accordance with various embodiments. The wireless network 2100 may include a UE 2102 in wireless communication with an AN 2104. The UE 2102 and AN 2104 may be similar to, and substantially interchangeable with, like-named components described elsewhere herein.

The UE 2102 may be communicatively coupled with the AN 2104 via connection 2106. The connection 2106 is illustrated as an air interface to enable communicative coupling, and can be consistent with cellular communications protocols such as an LTE protocol or a 5G NR protocol operating at mmWave or sub-6 GHZ frequencies.

The UE 2102 may include a host platform 2108 coupled with a modem platform 2110. The host platform 2108 may include application processing circuitry 2112, which may be coupled with protocol processing circuitry 2114 of the modem platform 2110. The application processing circuitry 2112 may run various applications for the UE 2102 that source/sink application data. The application processing circuitry 2112 may further implement one or more layer operations to transmit/receive application data to/from a data network. These layer operations may include transport (for example UDP) and Internet (for example, IP) operations The protocol processing circuitry 2114 may implement one or more of layer operations to facilitate transmission or reception of data over the connection 2106. The layer operations implemented by the protocol processing circuitry 2114 may include, for example, MAC, RLC, PDCP, RRC and NAS operations.

The modem platform 2110 may further include digital baseband circuitry 2116 that may implement one or more layer operations that are "below" layer operations performed by the protocol processing circuitry 2114 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 2110 may further include transmit circuitry 2118, receive circuitry 2120, RF circuitry 2122, and RF front end (RFFE) 2124, which may include or connect to one or more antenna panels 2126. Briefly, the transmit circuitry 2118 may include a digital-to-analog converter, mixer, intermediate frequency (IF) components, etc.; the receive circuitry 2120 may include an analog-to-digital converter, mixer, IF components, etc.; the RF circuitry 2122 may include a low-noise amplifier, a power amplifier, power tracking components, etc.; RFFE 2124 may include filters (for example, surface/bulk acoustic wave filters), switches, antenna tuners, beamforming components (for example, phase-array antenna components), etc. The selection and arrangement of the components of the transmit circuitry 2118, receive circuitry 2120, RF circuitry 2122, RFFE 2124, and antenna panels 2126 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 2114 may include one or more instances of control circuitry (not shown) to provide control functions for the transmit/receive components.

A UE reception may be established by and via the antenna panels 2126, RFFE 2124, RF circuitry 2122, receive circuitry 2120, digital baseband circuitry 2116, and protocol processing circuitry 2114. In some embodiments, the antenna panels 2126 may receive a transmission from the AN 2104 by receive-beamforming signals received by a plurality of antennas/antenna elements of the one or more antenna panels 2126.

A UE transmission may be established by and via the protocol processing circuitry 2114, digital baseband circuitry 2116, transmit circuitry 2118, RF circuitry 2122, RFFE 2124, and antenna panels 2126. In some embodiments, the transmit components of the UE 2104 may apply a spatial filter to the data to be transmitted to form a transmit beam emitted by the antenna elements of the antenna panels 2126.

Similar to the UE 2102, the AN 2104 may include a host platform 2128 coupled with a modem platform 2130. The host platform 2128 may include application processing circuitry 2132 coupled with protocol processing circuitry 2134 of the modem platform 2130. The modem platform may further include digital baseband circuitry 2136, transmit circuitry 2138, receive circuitry 2140, RF circuitry 2142, RFFE circuitry 2144, and antenna panels 2146. The components of the AN 2104 may be similar to and substantially interchangeable with like-named components of the UE 2102. In addition to performing data transmission/reception as described above, the components of the AN 2108 may perform various logical functions that include, for example, RNC functions such as radio bearer management, uplink and downlink dynamic radio resource management, and data packet scheduling.

Figure 22:
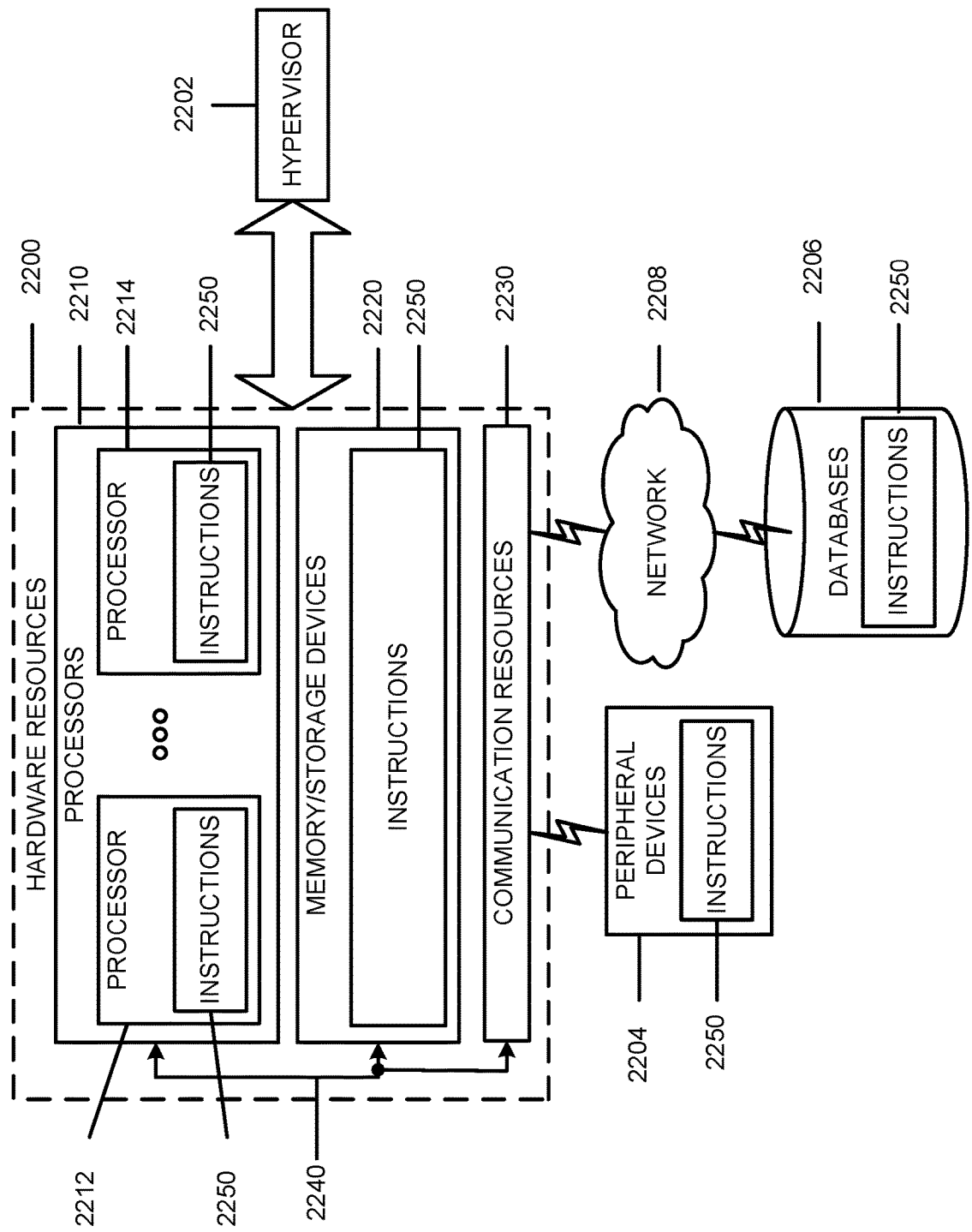
FIG. 22 is a block diagram illustrating components, according to some example embodiments, able to read instructions from a machine-readable or computer-readable medium (e.g., a non-transitory machine-readable storage medium) and perform any one or more of the methodologies discussed herein.

FIG. 22 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 22 shows a diagrammatic representation of hardware resources 2200 including one or more processors (or processor cores) 2210, one or more memory/storage devices 2220, and one or more communication resources 2230, each of which may be communicatively coupled via a bus 2240 or other interface circuitry. For embodiments where node virtualization (e.g., NFV) is utilized, a hypervisor 2202 may be executed to provide an execution environment for one or more network slices/sub-slices to utilize the hardware resources 2200.

The processors 2210 may include, for example, a processor 2212 and a processor 2214. The processors 2210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2220 may include main memory, disk storage, or any suitable combination thereof. The memory/storage devices 2220 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2230 may include interconnection or network interface controllers, components, or other suitable devices to communicate with one or more peripheral devices 2204 or one or more databases 2206 or other network elements via a network 2208. For example, the communication resources 2230 may include wired communication components (e.g., for coupling via USB, Ethernet, etc.), cellular communication components, NFC components, Bluetooth® (or Bluetooth® Low Energy) components, Wi-Fi® components, and other communication components.

Instructions 2250 may comprise software, a program, an application, an applet, an app, or other executable code for causing at least any of the processors 2210 to perform any one or more of the methodologies discussed herein. The instructions 2250 may reside, completely or partially, within at least one of the processors 2210 (e.g., within the processor's cache memory), the memory/storage devices 2220, or any suitable combination thereof. Furthermore, any portion of the instructions 2250 may be transferred to the hardware resources 2200 from any combination of the peripheral devices 2204 or the databases 2206. Accordingly, the memory of processors 2210, the memory/storage devices 2220, the peripheral devices 2204, and the databases 2206 are examples of computer-readable and machine-readable media.

Example Procedures

In some embodiments, the electronic device(s), network(s), system(s), chip(s) or component(s), or portions or implementations thereof, of FIGS. 20-22, or some other figure herein, may be configured to perform one or more processes, techniques, or methods as described herein, or portions thereof. One such process is depicted in FIG. 23. In some embodiments, the process of FIG. 23 may be performed by a UE or a portion thereof.

For example, the process may include, at 2305, retrieving, from memory, configuration information for a pathloss reference signal associated with an uplink signal to be transmitted using inter-cell multi-transmission-reception point (TRP) operation, wherein the configuration information includes a cell identifier (ID) and a frequency domain position of a synchronization signal block (SSB) associated with the pathloss reference signal. The process further includes, at 2310, measuring a pathloss on the pathloss reference signal based on the configuration information.

FIG. 24 illustrates another process in accordance with various embodiments, which may be performed by a gNB or a portion thereof. In this example, the process includes, at 2405, determining configuration information regarding synchronization signal blocks (SSBs) having different cell identifiers (IDs), wherein the configuration information is to configure a user equipment (UE) for multiple transmission and reception point (multi-TRP) operation. The process further includes, at 2410, encoding a message that includes the configuration information for transmission to the UE.

FIG. 25 illustrates another process in accordance with various embodiments. In some embodiments, the process may be performed by a UE or a portion thereof. In this example, the process includes, at 2505, receiving a message that includes configuration information indicating a plurality of synchronization signal blocks (SSBs) with different cell identifiers, wherein the configuration includes a beam failure recovery configuration information element that is to configure the UE with candidate reference signals from different cells for inter-cell beam failure detection. The process further includes, at 2510, performing a beam failure recovery operation based on the configuration information.

Figure 26:
FIG. 26 depicts another example procedure for practicing the various embodiments.

FIG. 26 illustrates another process in accordance with various embodiments. In some embodiments, the process may be performed by a UE or a portion thereof. In this example, the process includes, at 2605, performing a beam measurement operation. The process further includes, at 2610, encoding a beam reporting message for transmission based on the beam measurement, wherein the beam reporting message includes a cell identifier associated with a synchronization signal block resource indicator (SSBRI) or channel state information-reference signal resource indicator (CRI).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the TRP, which could be configured with different Cell IDs in the scenario of multi-TRP operation.

Example 2 may include the method of example 1 or some other example herein, wherein the TRP can configure the UE with path loss reference signal which can be used for uplink power control for PUSCH, PUCCH and SRS.

Example 3 may include the UE, which can perform measurement on the configured path loss reference signal to estimate the path loss.

Example 4 may include the method of example 2 or some other example herein, wherein for the PUSCH power control in the scenario of inter-cell multi-TRP operation, in the information element of PUSCH-PathlossReferenceRS, the cell ID information and the frequency domain position of the SSB should be added. The subcarrier spacing should be provided if it is different from subcarrier spacing of the serving cell.

Example 5 may include the method of example 2 or some other example herein, wherein for PUCCH power control in the scenario of inter-cell multi-TRP operation, in the information element of PUCCH-PathlossReferenceRS, the cell ID information and the frequency domain position of the SSB should be added. The subcarrier spacing should be provided if it is different from subcarrier spacing of the serving cell.

Example 6 may include the method of example 2 or some other example herein, wherein for SRS power control in the scenario of inter-cell multi-TRP operation, in the information element of PathlossReferenceRS-config which is contained in the configuration of SRS-ResourceSet, the cell ID information and the frequency domain position of the SSB should be added. The subcarrier spacing should be provided if it is different from subcarrier spacing of the serving cell.

Example 7 may include the method of example 2 or some other example herein, wherein for SRS power control in the scenario of inter-cell multi-TRP operation, the SRS pathloss reference signal could be configured at the SRS resource level. The IE of PathlossReferenceRS-config which includes Cell ID information could be contained in the IE of SRS-Resource.

Example 8 may include the method of example 1 and example 3 or some other example herein, wherein a default pathloss RS for PUCCH/SRS could be applied in order to reduce the higher layer signaling overhead to activate/deactivate the pathloss RS. For PUCCH/SRS, the default pathloss RS on a target TRP is the QCL-Type D RS of the same TCI state/QCL assumption of the CORESET with the lowest ID among those CORESETs with the same Cell ID. If the CORESET is not configured on a target TRP and at least one active state is configured for the PDSCH, then the default pathloss RS on the target TRP is the QCL-Type D RS of the active TCI state with the lowest ID among those TCI states with the same Cell ID for the PDSCH.

Example 9 may include the method of example 1 and example 3 or some other example herein, wherein in order to enable PUSCH scheduling with DCI format 0_0 in the scenario of inter-cell multi-TRP, a default pathloss RS for PUSCH can be applied. If no PUCCH resources are configured on the target TRP, the default pathloss RS for PUSCH is the QCL-Type D RS of the same TCI state/QCL assumption of the CORESET with the lowest ID among those CORESETs with the same Cell ID. Alternatively the default pathloss RS for PUSCH is the pathloss RS for the PUCCH resource with the lowest ID targeting at the TRP with the same Cell ID.

Example 10 may include a method of a UE, the method comprising:
  receiving configuration information for a pathloss reference signal associated with an uplink signal to be transmitted using inter-cell multi-transmission-reception point (TRP) operation, wherein the configuration information includes a cell ID and a frequency domain of an SSB associated with the pathloss reference signal; and
  measuring or causing measurement of a pathloss on the pathloss reference signal based on the configuration information.

Example 11 may include the method of example 10 or some other example herein, further comprising encoding the uplink signal for transmission based on the measured pathloss.

Example 12 may include the method of example 10-11 or some other example herein, wherein the uplink signal is a PUSCH.

Example 13 may include the method of example 12 or some other example herein, wherein the configuration information is included in a PUSCH-PathlossReferenceRS information element.

Example 14 may include the method of example 10-11 or some other example herein, wherein the uplink signal is a PUCCH.

Example 15 may include the method of example 14 or some other example herein, wherein the configuration information is included in a PUCCH-PathlossReferenceRS information element.

Example 16 may include the method of example 10-11 or some other example herein, wherein the uplink signal is a SRS.

Example 17 may include the method of example 16 or some other example herein, wherein the configuration information is included in a PathlossReferenceRS-Config information element within a message that configures an SRS resource set.

Example 18 may include the method of example 16 or some other example herein, wherein the pathloss reference signal is associated with an individual SRS resource.

Example 19 may include the method of example 18 or some other example herein, wherein the configuration information is included in a PathlossReferenceRS-Config information element within an SRS-Resource information element.

Example 20 may include the method of example 10-19 or some other example herein, wherein the configuration information further includes a subcarrier spacing of the pathloss reference signal.

Example 21 may include the method of example 20 or some other example herein, wherein the configuration information includes the subcarrier spacing of the pathloss reference signal if the subcarrier spacing is different than a subcarrier spacing of a serving cell of the UE.

Example 22 may include a method comprising:
  determining configuration information for a pathloss reference signal associated with an uplink signal to be transmitted by a UE using inter-cell multi-transmission-reception point (TRP) operation, wherein the configuration information includes a cell ID and a frequency domain of an SSB associated with the pathloss reference signal; and
  encoding the configuration information for transmission to the UE.

Example 23 may include the method of example 22 or some other example herein, further comprising encoding the pathloss reference signal for transmission to the UE based on the configuration information.

Example 24 may include the method of example 22-23 or some other example herein, further comprising receiving the uplink signal from the UE.

Example 25 may include the method of example 22-24 or some other example herein, wherein the configuration information further includes a subcarrier spacing of the pathloss reference signal.

Example 26 may include the method of example 25 or some other example herein, wherein the configuration information includes the subcarrier spacing of the pathloss reference signal if the subcarrier spacing is different than a subcarrier spacing of a serving cell of the UE.

Example 27 may include the method of example 22-26 or some other example herein, wherein the uplink signal is a PUSCH.

Example 28 may include the method of example 27 or some other example herein, wherein the configuration information is included in a PUSCH-PathlossReferenceRS information element.

Example 29 may include the method of example 22-26 or some other example herein, wherein the uplink signal is a PUCCH.

Example 30 may include the method of example 29 or some other example herein, wherein the configuration information is included in a PUCCH-PathlossReferenceRS information element.

Example 31 may include the method of example 22-26 or some other example herein, wherein the uplink signal is a SRS.

Example 32 may include the method of example 31 or some other example herein, wherein the configuration information is included in a PathlossReferenceRS-Config information element within a message that configures an SRS resource set.

Example 33 may include the method of example 31 or some other example herein, wherein the pathloss reference signal is associated with an individual SRS resource.

Example 34 may include the method of example 33 or some other example herein, wherein the configuration information is included in a PathlossReferenceRS-Config information element within an SRS-Resource information element.

Example 35 may include the method of example 22-34 or some other example herein, wherein the method is performed by a TRP or a portion thereof.

Example 36 may include a method comprising:
determining configuration information for a default pathloss reference signal associated with an uplink signal to be transmitted using inter-cell multi-transmission-reception point (TRP) operation, wherein the configuration information includes a cell ID and a frequency domain of an SSB associated with the default pathloss reference signal; and
measuring or causing measurement of a pathloss on the default pathloss reference signal based on the configuration information.

Example 37 may include the method of example 36 or some other example herein, further comprising encoding the uplink signal for transmission based on the measured pathloss.

Example 38 may include the method of example 36-37 or some other example herein, wherein the uplink signal is a PUSCH, a PUCCH, and/or a SRS.

Example 39 may include the method of example 36-38 or some other example herein, wherein the default pathloss reference signal on a target TRP is a QCL-Type D reference signal of a same TCI state and/or QCL assumption of a CORESET with a lowest ID among CORESETs with the same cell ID.

Example 40 may include the method of example 36-39 or some other example herein, wherein if a CORESET is not configured on a target TRP and at least one active state is configured for the uplink signal, then the default pathloss reference signal on a target TRP is the QCL-Type D RS of the active TCI state with the lowest ID among those TCI states with the same Cell ID.

Example 41 may include the method of example 36-40 or some other example herein, wherein the uplink signal is a PUSCH, and wherein the default pathloss reference signal for the PUSCH is the pathloss reference signal for at PUCCH resource with the lowest ID targeting at the TRP with the same Cell ID as the PUSCH.

Example 42 may include the method of example 36-41 or some other example herein, wherein the method is performed by a UE or a portion thereof.
AC9700

Example A1 may include a method of operating a device in a wireless system, the method comprises: configuring a transmission and reception point (TRP) with different Cell IDs for multi-TRP operation.

Example A2 may include the method of example A1 or some other example herein, wherein the SSBs with different Cell IDs from different TRPs could be configured to the UE for beam management.

Example A3 may include the method of example A2 or some other example herein, wherein the SSBs with different Cell IDs could be FDMed, e.g., occupy different frequency resources over the same OFDM symbols. From the UE perspective, the UE treats the FDMed SSBs with different Cell IDs are from different cells. The SSB with the same index and the same Cell ID recurring with the SSB periodicity is QCLed.

Example A4 may include the method of example A3 or some other example herein, wherein in the RRC information element CSI-SSB-ResourceSet, the gNB could configure the SSBs with different Cell IDs for beam management Example A5 may include the method of example A4 or some other example herein, wherein in the RRC information element CSI-SSB-ResourceSet, the SSBs are separated into different subsets and each subset is associated with a Cell ID. The SSB Index within one subset are configured with the same Cell ID.

Example A6 may include the method of example A4 or some other example herein, wherein in the RRC information element CSI-SSB-ResourceSet, the SSB index are defined globally among the TRPs cooperating for beam management.

Example A7 may include the method of example A4 or some other example herein, wherein in the RRC information element CSI-SSB-ResourceSet, the set of logical indices of SSBs configuration may additionally include a list of physic cell identities, a set of frequency domain position of SSBs and a set of subcarrier spacing if it is different from subcarrier spacing of the serving cell.

Example A8 may include the method of example A3 or some other example herein, wherein in the RRC information element PUCCH-SpatialRelationInfo, the logical index of SSB may additionally include the physical cell identity, the frequency domain position of the SSB and the subcarrier spacing if it is different from subcarrier spacing of the serving cell.

Example A9 may include the method of example A3 or some other example herein, wherein in the RRC information element SRS-SpatialRelationInfo, the logical index of SSB may additionally include the physical cell identity, the frequency domain position of SSB and the subcarrier spacing if it is different from subcarrier spacing of the serving cell.

Example A10 may include the method of example A2 or some other example herein, wherein the SSBs with different Cell IDs could be mapped over the same frequency position, e.g., the SSBs are SDMed instead of FDMed.

Example A11 may include the method of example A10 or some other example herein, wherein in the RRC information element CSI-SSB-ResourceSet, the set of logical indices of SSBs configuration may additionally include a list of physic cell identities, and a set of subcarrier spacing if it is different from subcarrier spacing of the serving cell.

Example A12 includes a method comprising:
determining configuration information regarding synchronization signal blocks (SSBs) having different cell identifiers (IDs), wherein the configuration information is to configure a user equipment (UE) for multiple transmission and reception point (multi-TRP) operation; and encoding the configuration information for transmission to the UE.

Example A13 includes the method of example A12 or some other example herein, wherein the SSBs are frequency division multiplexed (FDMed) to occupy different frequency resources over common orthogonal frequency-division multiplexing (OFDM) symbols.

Example A14 includes the method of example A12 or some other example herein, wherein the configuration information is included in an information element (IE) encoded for transmission to the UE via radio resource control (RRC) signaling.

Example A14a includes the method of example A14 or some other example herein, wherein the RRC IE an indication of a physical cell identifier associated with an SSB index, an SSB frequency position, or a subcarrier spacing.

Example A15 includes the method of example A12 or some other example herein, wherein the SSBs include a plurality of subsets, wherein a first subset of SSBs is associated with a first cell ID and a second subset of SSBs is associated with a second cell ID.

Example A16 includes the method of example A12 or some other example herein, wherein an SSB index is defined globally among the TRPs.

Example A17 includes the method of example A12 or some other example herein, wherein the configuration information includes an indication of SSB resources for L1-RSRP or L1-SINR measurement.

Example A18 includes the method of example A12 or some other example herein, wherein the configuration information further includes spatial relation information for physical uplink control channel (PUCCH).

Example A19 includes the method of example A12 or some other example herein, wherein the SSBs are mapped over a common frequency position.

Example A20 includes the method of any of examples A12-A19 or some other example herein, wherein the method is performed by a next-generation NodeB (gNB) or portion thereof.

AC9702

Example B1 may include a method of operating a device in a wireless system, wherein the method comprises: configuring a transmission reception point (TRP) with different Cell IDs for a scenario of multi-TRP operation.

Example B2 may include the method of example B1 or some other example herein, wherein the SSBs with different Cell ID could be configured to the UE so that the UE can perform inter-cell/TRP-specific beam failure recovery operation, Example B3 may include the method of example B2 or some other example herein, wherein the inter-cell beam failure recovery operation could be optional. It can be configured by the network or up to UE capability.

Example B4 may include the method of example B2 or some other example herein, wherein periodic reference signals with different cell-ID, e.g., SSB index with different Cell ID, could be configured to the UE to perform beam failure detection. In the RRC information element, the physical cell ID should be associated to the SSB index. The SSB frequency position and subcarrier spacing could be also added.

Example B5 may include the method of example B2 or some other example herein, wherein for inter-cell beam failure detection, separate timer and counter should be maintained by the UE for cells with different Cell ID.

Example B6 may include the method of example B2 or some other example herein, wherein for inter-cell beam failure detection, the UE could be configured with candidate reference signals from different cells, e.g., SSB index with different Cell ID. After beam failure is declared over a specific cell, the UE should identify a candidate new beam over that cell.

Example B7 may include the method of example B2 or some other example herein, wherein for inter-cell beam failure recovery operation, the beam failure recovery request could be sent over dedicated PRACH to the target cell. Dedicated PRACH resource should be configured for cells with different Cell ID.

Example B8 may include the method of example B2 or some other example herein, wherein for inter-cell beam failure recovery operation, the beam failure recovery request could be sent over PUCCH. For example, the UE detects beam failure happens with TRP A (Cell ID #1), and TRP B (Cell ID #2) still works. Then firstly the UE can deliver beam failure recovery request over dedicated SR-like PUCCH resource (PUCCH-BFR) to TRP A. Secondly the UE can deliver a MAC-CE to TRP A reporting the new beam index together with the Cell ID (#2). If the UE has resource for transmission, the first step could be skipped.

Example B9 may include the method of example B2 or some other example herein, wherein for inter-cell beam failure recovery, if the beam failure recovery request is sent over PRACH, the UE should monitor a dedicated CORESET from the target cell for beam failure recovery response. After the UE receives DCI over the dedicated CORESET from the target cell, the UE assume the beam failure is recovered with the target cell.

Example B10 may include the method of example B2 or some other example herein, wherein for inter-cell beam failure recovery, if the beam failure recovery request is sent over PUCCH, after receiving a uplink grant scheduling a new transmission for the same HARQ process ID as the PUSCH carrying the MAC-CE, the UE assumes the beam failure recovery procedure is finished.

Example B11 includes a method comprising:
receiving a message that includes configuration information indicating a plurality of synchronization signal blocks (SSBs) with different cell identifiers; and
performing a beam failure recovery operation based on the configuration information.

Example B11.1 includes the method of example B11 or some other example herein, wherein receiving the configuration information includes receiving and decoding a beam failure recovery configuration information element that is to configure the UE with candidate reference signals from different cells for inter-cell beam failure detection. Example 12 includes the method of example 11 or some other example herein, wherein the SSBs are frequency-division multiplexed (FDMed) to occupy different frequency resources over common orthogonal frequency-division multiplexing (OFDM) symbols.

Example B13 includes the method of example B11 or some other example herein, wherein the method further includes receiving a reference signal (RS) for new beam identification, and wherein performing the beam failure recovery operation includes detecting beam failure for a first cell and identifying a new candidate beam of a target cell based on the RS for new beam identification.

Example B14 includes the method of example B11 or some other example herein, wherein the message is received via radio resource control (RRC) signaling.

Example B15 includes the method of example B14 or some other example herein, wherein the configuration information includes an RRC information element (IE) (for example, a radio link monitoring RS IE) that includes an indication of a physical cell identifier associated with an SSB index, an SSB frequency position, or a subcarrier spacing.

Example B16 includes the method of example B11 or some other example herein, wherein performing the beam failure recovery operation includes maintaining a separate timer for cells with different cell identifiers.

Example B17 includes the method of example B11 or some other example herein, wherein performing the beam failure recovery operation includes transmitting a beam failure recovery request to a target cell over a dedicated physical random access channel (PRACH).

Example B18 includes the method of example B17 or some other example herein, wherein the method further includes receiving a beam failure recovery response from the target cell.

Example B19 includes the method of example B11 or some other example herein, wherein performing the beam failure recovery operation includes transmitting a beam failure recovery request to a target cell over physical uplink control channel (PUCCH).

Example B20 includes the method of example B19 or some other example herein, further comprising concluding the beam failure recovery operation in response to receiving an uplink grant scheduling a new transmission for the a hybrid automatic repeat request (HARQ) process identifier common with a physical uplink shared channel (PUSCH) carrying a medium access control-control element (MAC-CE).

Example B21 includes the method of any of examples B11-B20 or some other example herein, wherein the method is performed by a user equipment (UE) or portion thereof.

Example B22 includes a method comprising:
determining configuration information indicating a plurality of synchronization signal blocks (SSBs) with different cell identifiers, wherein the configuration information is to configure a user equipment (UE) to perform a beam failure recovery operation; and
encoding a message that includes the configuration information for transmission to the UE.

Example B23 includes the method of example B22 or some other example herein, wherein the SSBs are frequency-division multiplexed (FDMed) to occupy different frequency resources over common orthogonal frequency-division multiplexing (OFDM) symbols.

Example B24 includes the method of example B11 or some other example herein, wherein the message is encoded for transmission to the UE via radio resource control (RRC) signaling.

Example B25 includes the method of example B24 or some other example herein, wherein the configuration information includes an RRC information element (IE) that includes an indication of a physical cell identifier associated with an SSB index, an SSB frequency position, or a subcarrier spacing.

Example B26 includes the method of any of examples B22-B25 or some other example herein, wherein the method is performed by a next-generation NodeB (gNB) or portion thereof.
AD0012

Example C1 may include a method of operating a wireless system, the method comprising configuring a transmission reception point (TRP) with different Cell IDs in the scenario of multi-TRP operation.

Example C2 may include the method of example C1 or some other example herein, wherein the UE performs beam measurement based on the TRP information and reports the results to the network.

Example C3 may include the method of example C2 or some other example herein, wherein in the beam reporting, the UE reports the Cell ID information for each SSBRI or CRI. The Cell ID information could include physical cell ID or logical TRP ID.

Example C4 may include the method of example C2 or some other example herein, wherein in the beam reporting, besides the Cell ID information, the UE should also report the UE panel ID information for each SSBRI or CRI, indicating which UE antenna panel is used to receive the corresponding Tx beam. The UE panel ID could be replaced by the SRS port group ID, e.g., one UE antenna panel is associated with one SRS port group.

Example C5 may include the method of examples C1 and C2 or some other example herein, wherein the UE is configured with TCI states according to the beam reporting. In the TCI state, the cell ID information should be added to the reference signal so that the UE knows which cell the RS is from. The frequency domain position of the SSB is also included. In addition, the subcarrier spacing should be provided if it is different from subcarrier spacing of the serving cell.

Example C6 may include the method of examples C1 and C2 or some other example herein, wherein in the TCI state, the UE panel information should be additionally included. When the UE receives the TCI state with UE panel information, the corresponding UE panel should be used for the reception from the target cell. Alternatively, the UE panel ID could be added into the QCL-Info IE.

Example C7 may include the method of examples C1 and C2 or some other example herein, wherein for the PUCCH beam indication, in PUCCH-SpatialRelationInfo, the cell ID information and the frequency domain position of the SSB is added. The subcarrier spacing should be provided if it is different from subcarrier spacing of the serving cell. In addition, the UE panel information should be additionally included to indicate which UE panel should be used.

Example C8 may include the method of examples C1 and C2 or some other example herein, wherein in SRS-SpatialRelationInfo, the cell ID information and the frequency domain position of the SSB is added. The subcarrier spacing should be provided if it is different from subcarrier spacing of the serving cell. In addition, the UE panel information should be additionally included to indicate which UE panel should be used.

Example C9 may include the method of examples C1 and C2 or some other example herein, wherein for PUSCH transmission, the spatial relation is indicated by SRI if it is scheduled by DCI format 0_1. If PUSCH is scheduled by DCI format 0_0, a default spatial relation should be followed for the PUSCH transmission. The default spatial relation could be the spatial relation of one specific PUCCH resource. The PUCCH resource grouping should be associated with TRP or UE panel. In the PUCCH-ResourceGroup, the Cell ID or UE panel ID should be included. Alternatively, the PUCCH grouping could be associated with the logical TRP ID.

Example C10 may include the method of examples C1 and C2 or some other example herein, wherein in the scenario of multi-TRP multi-panel, PUSCH is not expected to be scheduled by DCI format 0_0 for the following cases if Single DCI scheduling is used or inter-cell operation is enabled.

Example C11 includes a method comprising:
performing a beam measurement; and
encoding a beam reporting message for transmission based on the beam measurement, wherein the beam reporting message includes cell identifier information.

Example C12 includes the method of example C11 or some other example herein, wherein the cell identifier information is associated with a synchronization signal block resource indicator (SSBRI) or channel state information-reference signal resource indicator (CRI).

Example C13 includes the method of example C12 or some other example herein, wherein the beam reporting message includes an indication of a layer 1 reference signal received power (L1-RSRP) or signal-to-noise and interference ratio (SINR).

Example C14 includes the method of example C11 or some other example herein, wherein the cell identifier is a physical cell identifier or a logical transmission reception point (TRP) identifier.

Example C15 includes the method of example C11 or some other example herein, wherein the cell identifier is associated with a UE panel identifier.

Example C16 includes the method of example C15 or some other example herein, wherein the beam reporting message further includes the UE panel identifier.

Example C16a includes the method of example C11 or some other example herein, wherein the beam reporting message is associated with a physical uplink control channel (PUCCH) transmission.

Example C16b includes the method of example C11 or some other example herein, wherein the beam reporting message is associated with a physical uplink shared channel (PUSCH) transmission.

Example C17 includes the method of any of examples C11-C16b or some other example herein, wherein the method is performed by a UE or portion thereof.

Example C18 includes a method comprising:
receiving beam reporting information from a user equipment (UE);
determining, based on the beam reporting information, transmission configuration indicator (TCI) state information that includes a cell identifier; and
encoding a message including the TCI state information for transmission to the UE.

Example C19 includes the method of example C18 or some other example herein, wherein the message further includes an indication of a frequency domain position of a synchronization signal block (SSB).

Example C20 includes the method of example C18 or some other example herein, wherein the message further includes an indication of a subcarrier spacing.

Example C21 includes the method of example C18 or some other example herein, wherein the TCI state information further includes UE panel information.

Example C22 includes the method of example C18 or some other example herein, wherein the message further comprises quasi co-location (QCL) information that includes UE panel information.

Example C23 includes the method of example C22 or some other example herein, wherein the QCL information further includes an indication of a maximum number of UE antenna panels or a maximum number of simultaneously active UE antenna panels.

Example C24 includes the method of any of examples C18-C23 or some other example herein, wherein the method is performed by a next-generation NodeB (gNB) or portion thereof.

Example X1 includes an apparatus comprising: memory to store configuration information for a pathloss reference signal associated with an uplink signal to be transmitted using inter-cell multi-transmission-reception point (TRP) operation, wherein the configuration information includes a cell identifier (ID) and a frequency domain position of a synchronization signal block (SSB) associated with the pathloss reference signal; and processing circuitry, coupled with the memory, to: retrieve the configuration information from the memory; and measuring a pathloss on the pathloss reference signal based on the configuration information.

Example X2 includes the apparatus of example X1 or some other example herein, wherein the processing circuitry is further to encode the uplink signal for transmission based on the measured pathloss.

Example X3 includes the apparatus of example X1 or some other example herein, wherein the uplink signal is a physical uplink shared channel (PUSCH) signal and the configuration information is included in a PUSCH-Pathloss-ReferenceRS information element.

Example X4 includes the apparatus of example X1 or some other example herein, wherein the uplink signal is a physical uplink control channel (PUCCH) signal and the configuration information is included in a PUCCH-Pathloss-ReferenceRS information element.

Example X5 includes the apparatus of example X1 or some other example herein, wherein the uplink signal is a sounding reference signal (SRS) and the configuration information is included in a PathlossReferenceRS-Config information element within a message that configures an SRS resource set.

Example X6 includes the apparatus of any of examples X1-X5 or some other example herein, wherein the configuration information further includes a subcarrier spacing of the pathloss reference signal.

Example X7 includes one or more computer-readable media storing instructions that, when executed by one or more processors, cause a next-generation NodeB (gNB) to: determine configuration information regarding synchronization signal blocks (SSBs) having different cell identifiers (IDs), wherein the configuration information is to configure a user equipment (UE) for multiple transmission and reception point (multi-TRP) operation; and encoding a message that includes the configuration information for transmission to the UE.

Example X8 includes the one or more computer-readable media of example X7 or some other example herein, wherein the SSBs are frequency division multiplexed (FDMed) to occupy different frequency resources over common orthogonal frequency-division multiplexing (OFDM) symbols.

Example X9 includes the one or more computer-readable media of example X7 or some other example herein, wherein the message includes an information element (IE) that contains the configuration information, and the message is encoded for transmission to the UE via radio resource control (RRC) signaling.

Example X10 includes the one or more computer-readable media of example X9 or some other example herein, wherein the IE includes an indication of a physical cell identifier associated with an SSB index, an SSB frequency position, or a subcarrier spacing.

Example X11 includes the one or more computer-readable media of example X7 or some other example herein, wherein the SSBs include a first subset of the SSBs that is associated with a first cell ID and a second subset of the SSBs that is associated with a second cell ID.

Example X12 includes the one or more computer-readable media of any of examples X7-X11, wherein an SSB index is defined globally among a plurality of TRPs.

Example X13 includes one or more computer-readable media storing instructions that, when executed by one or more processors, cause a user equipment (UE) to: receive a message that includes configuration information indicating a plurality of synchronization signal blocks (SSBs) with different cell identifiers, wherein the configuration includes a beam failure recovery configuration information element that is to configure the UE with candidate reference signals from different cells for inter-cell beam failure detection; and perform a beam failure recovery operation based on the configuration information.

Example X14 includes the one or more computer-readable media of example X13 or some other example herein, wherein the SSBs are frequency-division multiplexed (FDMed) to occupy different frequency resources over common orthogonal frequency-division multiplexing (OFDM) symbols.

Example X15 includes the one or more computer-readable media of example X13 or some other example herein, wherein the media further stores instructions to cause the UE to receive a reference signal (RS) for new beam identification, and wherein performing the beam failure recovery operation includes detecting beam failure for a first cell and identifying a new candidate beam of a target cell based on the RS for new beam identification.

Example X16 includes the one or more computer-readable media of example X13 or some other example herein, wherein the configuration information includes an indication of a physical cell identifier associated with an SSB index, an SSB frequency position, or a subcarrier spacing.

Example X17 includes the one or more computer-readable media of example X13 or some other example herein, wherein performing the beam failure recovery operation includes maintaining a separate timer for cells with different cell identifiers.

Example X18 includes the one or more computer-readable media of any of examples X13-X17, wherein the message is received via radio resource control (RRC) signaling.

Example X19 includes one or more computer-readable media storing instructions that, when executed by one or more processors, cause a user equipment (UE) to: perform a beam measurement operation; encode a beam reporting message for transmission based on the beam measurement, wherein the beam reporting message includes a physical cell identifier associated with a synchronization signal block resource indicator (SSBRI) or channel state information-reference signal resource indicator (CRI); and receive TCI state configuration information to support inter-cell beam management, wherein the TCI state configuration information includes the physical cell identifier.

Example X20 includes the one or more computer-readable media of example X19 or some other example herein, wherein the beam reporting message further includes an indication of a layer 1 reference signal received power (L1-RSRP) or signal-to-noise and interference ratio (SINR).

Example X21 includes the one or more computer-readable media of example X19 or some other example herein, wherein the cell identifier is a physical cell identifier or a logical transmission reception point (TRP) identifier, or the physical cell identifier is associated with a UE panel identifier.

Example X22 includes the one or more computer-readable media of example X19 or some other example herein, wherein the beam reporting message is associated with a physical uplink control channel (PUCCH) transmission or a physical uplink shared channel (PUSCH) transmission.

Example X23 includes the one or more computer-readable media of example X19 or some other example herein, wherein the TCI state configuration information further includes an indication of a frequency domain position of a synchronization signal block (SSB) or an indication of a subcarrier spacing.

Example X24 includes the one or more computer-readable media of example X19 or some other example herein, wherein the media further stores instructions to cause the UE to receive quasi co-location (QCL) information that includes an indication of a maximum number of UE antenna panels or a maximum number of simultaneously active UE antenna panels.

Example Z01 may include an apparatus comprising means to perform one or more elements of a method described in or related to any of examples 1-X24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X24, or any other method or process described herein.

Example Z03 may include an apparatus comprising logic, modules, or circuitry to perform one or more elements of a method described in or related to any of examples 1-X24, or any other method or process described herein.

Example Z04 may include a method, technique, or process as described in or related to any of examples 1-X24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X24, or portions thereof.

Example Z06 may include a signal as described in or related to any of examples 1-X24, or portions or parts thereof.

Example Z07 may include a datagram, packet, frame, segment, protocol data unit (PDU), or message as described in or related to any of examples 1-X24, or portions or parts thereof, or otherwise described in the present disclosure.

Example Z08 may include a signal encoded with data as described in or related to any of examples 1-X24, or portions or parts thereof, or otherwise described in the present disclosure.

Example Z09 may include a signal encoded with a datagram, packet, frame, segment, protocol data unit (PDU), or message as described in or related to any of examples 1-X24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X24, or portions thereof.

Example Z11 may include a computer program comprising instructions, wherein execution of the program by a processing element is to cause the processing element to carry out the method, techniques, or process as described in or related to any of examples 1-X24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators.

The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like. The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus for use in a user equipment (UE), wherein the apparatus comprises:
   memory to store an information element (IE) received from a base station, wherein the IE is related to a synchronization signal block (SSB) resource set, and wherein the IE includes:
      an indication of one or more SSBs; and
      an indication of one or more physical cell identifiers (IDs);
      wherein respective ones of the SSBs are associated with respective ones of the physical cell IDs;
      wherein a default value in the indication of the one or more physical cell identifiers indicates reuse of a physical cell identifier of a serving cell; and
   one or more processors configured to cause the UE to perform one or more measurements based on the one or more SSBs.

2. The apparatus of claim 1, wherein the IE is a CSI-SSB ResourceSet IE.

3. The apparatus of claim 1, wherein the measurement is related to a beam failure detection process based on the one or more SSBs.

4. The apparatus of claim 1, wherein the measurement is a reference signal received power (RSRP) measurement.

5. The apparatus of claim 1, wherein the one or more physical cell IDs are a plurality of physical cell IDs, and wherein different ones of the plurality of physical cell IDs are related to different transmit/receive points (TRPs) of a plurality of TRPs.

6. The apparatus of claim 5, wherein the indication of the one or more SSBs is based on a pool of SSB index values that are shared between the plurality of TRPs.

7. The apparatus of claim 1, wherein the one or more SSBs are a plurality of SSBs, and wherein respective SSBs of the plurality of SSBs are frequency division multiplexed (FDMed).

8. One or more non-transitory computer-readable media comprising instructions that, upon execution of the instructions by one or more processors of a user equipment (UE), are to cause the UE to:
   identify an information element (IE) received from a base station, wherein the IE is related to a synchronization signal block (SSB) resource set, and wherein the IE includes:
      an indication of one or more SSBs; and
      an indication of one or more physical cell identifiers (IDs);
      wherein respective ones of the SSBs are associated with respective ones of the physical cell IDs;
      wherein a default value in the indication of the one or more physical cell identifiers indicates reuse of a physical cell identifier of a serving cell; and
   perform one or more measurements based on the one or more SSBs.

9. The one or more non-transitory computer-readable media of claim 8, wherein the IE is a CSI-SSB-ResourceSet IE.

10. The one or more non-transitory computer-readable media of claim 8, wherein the measurement is related to a beam failure detection process based on the one or more SSBs.

11. The one or more non-transitory computer-readable media of claim 8, wherein the measurement is a reference signal received power (RSRP) measurement.

12. The one or more non-transitory computer-readable media of claim 8, wherein the one or more physical cell IDs are a plurality of physical cell IDs, and wherein different ones of the plurality of physical cell IDs are related to different transmit/receive points (TRPs) of a plurality of TRPs.

13. The one or more non-transitory computer-readable media of claim 12, wherein the indication of the one or more SSBs is based on a pool of SSB index values that are shared between the plurality of TRPs.

14. The one or more non-transitory computer-readable media of claim 8, wherein the one or more SSBs are a plurality of SSBs, and wherein respective SSBs of the plurality of SSBs are frequency division multiplexed (FDMed).

15. One or more non-transitory computer-readable media comprising instructions that, upon execution of the instructions by one or more processors of a base station, are to cause the base station to:
transmit, to a user equipment (UE), an information element (IE) that is related to a synchronization signal block (SSB) resource set, wherein the IE includes:
an indication of a plurality of SSBs; and
an indication of one or more physical cell identifiers (IDs);
wherein respective ones of the SSBs are associated with respective ones of the physical cell IDs;
wherein a default value in the indication of the one or more physical cell identifiers indicates reuse of a physical cell identifier of a serving cell; and
identify, from the UE, an indication of one or more measurements performed by the UE based on the one or more SSBs.

16. The one or more non-transitory computer-readable media of claim 15, wherein the IE is a CSI-SSB-Resource-Set IE.

17. The one or more non-transitory computer-readable media of claim 15, wherein the measurement is related to a beam failure detection process based on the one or more SSBs.

18. The one or more non-transitory computer-readable media of claim 15, wherein the measurement is a reference signal received power (RSRP) measurement.

19. The one or more non-transitory computer-readable media of claim 15, wherein the one or more physical cell IDs are a plurality of physical cell IDs, and wherein different ones of the plurality of physical cell IDs are related to different transmit/receive points (TRPs) of a plurality of TRPs.

20. The one or more non-transitory computer-readable media of claim 15, wherein the one or more SSBs are a plurality of SSBs, and wherein respective SSBs of the plurality of SSBs are frequency division multiplexed (FDMed).

* * * * *